US012081289B2

(12) United States Patent
Choi et al.

(10) Patent No.: US 12,081,289 B2
(45) Date of Patent: Sep. 3, 2024

(54) ACCESS CONTROL METHOD AND DEVICE IN WIRELESS POWER TRANSMISSION SYSTEM

(71) Applicant: LG Electronics Inc., Seoul (KR)

(72) Inventors: Jingu Choi, Seoul (KR); Jinkwon Lim, Seoul (KR); Minsoo Lee, Seoul (KR); Joonho Park, Seoul (KR); Jaehyu Kim, Seoul (KR); Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 17/616,535

(22) PCT Filed: Jan. 30, 2020

(86) PCT No.: PCT/KR2020/001428
§ 371 (c)(1),
(2) Date: Dec. 3, 2021

(87) PCT Pub. No.: WO2020/246685
PCT Pub. Date: Dec. 10, 2020

(65) Prior Publication Data
US 2022/0239347 A1 Jul. 28, 2022

(30) Foreign Application Priority Data
Jun. 3, 2019 (KR) .................. 10-2019-0065295

(51) Int. Cl.
H04B 5/79 (2024.01)
H02J 50/10 (2016.01)
(Continued)

(52) U.S. Cl.
CPC ............... H04B 5/79 (2024.01); H02J 50/10 (2016.02); H02J 50/40 (2016.02); H02J 50/80 (2016.02)

(58) Field of Classification Search
None
See application file for complete search history.

(56) References Cited

U.S. PATENT DOCUMENTS

2012/0306284 A1* 12/2012 Lee .................. H02J 50/80
307/104
2015/0137746 A1* 5/2015 Lee .................. H02J 7/00047
320/108

(Continued)

FOREIGN PATENT DOCUMENTS

KR 20120068412 6/2012
KR 20160041571 4/2016

(Continued)

OTHER PUBLICATIONS

Brand Buide for Bluetooth Trademarks, Bluetooth SIG. Available at https://www.bluetooth.com/wp-content/uploads/2022/06/Brand-Guide-for-Bluetooth-Trademarks_Jun2022.pdf (Year: 2022).*

Primary Examiner — Adi Amrany
(74) Attorney, Agent, or Firm — Fish & Richardson P.C.

(57) ABSTRACT

The present invention relates to an access control method and device in a wireless power transmission system. A wireless power transmission device comprises: a power conversion circuit configured to have a plurality of primary coils and transmit wireless power to a wireless power reception device by using the primary coil which has formed magnetic coupling to the wireless power reception device at an operating frequency; and a communication/control circuit configured to perform in-band communication with the wireless power reception device by using the operating frequency and perform out-band communication with the wireless power reception device by using a frequency other than the operating frequency, wherein the communication/control circuit can transmit information for notifying (Continued)

whether or not connection to the wireless power reception device is possible by using the out-band communication.

3 Claims, 30 Drawing Sheets

(51) Int. Cl.
*H02J 50/40* (2016.01)
*H02J 50/80* (2016.01)

(56) References Cited

U.S. PATENT DOCUMENTS

| | | | | |
|---|---|---|---|---|
| 2016/0165649 | A1* | 6/2016 | Polo | H04W 4/80 |
| | | | | 455/411 |
| 2017/0178804 | A1* | 6/2017 | Leem | H01F 27/36 |
| 2017/0237301 | A1* | 8/2017 | Elad | H02J 50/10 |
| | | | | 307/104 |
| 2018/0205257 | A1* | 7/2018 | Kwon | H02J 50/12 |
| 2018/0212470 | A1* | 7/2018 | Leem | H02J 50/40 |
| 2018/0287413 | A1* | 10/2018 | Jung | H02J 50/402 |
| 2018/0294681 | A1* | 10/2018 | Bae | H02J 50/80 |
| 2018/0366986 | A1* | 12/2018 | Kim | H02J 50/80 |
| 2019/0058506 | A1* | 2/2019 | Lee | H02J 50/12 |
| 2019/0230451 | A1* | 7/2019 | Dickmann | H04R 25/554 |
| 2020/0161907 | A1* | 5/2020 | Yang | H02J 50/10 |
| 2022/0158504 | A1* | 5/2022 | Park | H02J 50/80 |
| 2022/0294272 | A1* | 9/2022 | Lee | H02J 50/60 |

FOREIGN PATENT DOCUMENTS

| | | |
|---|---|---|
| WO | WO2016179271 | 11/2016 |
| WO | WO2018093099 | 5/2018 |
| WO | WO2019059427 | 3/2019 |

\* cited by examiner

FIG. 3b

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

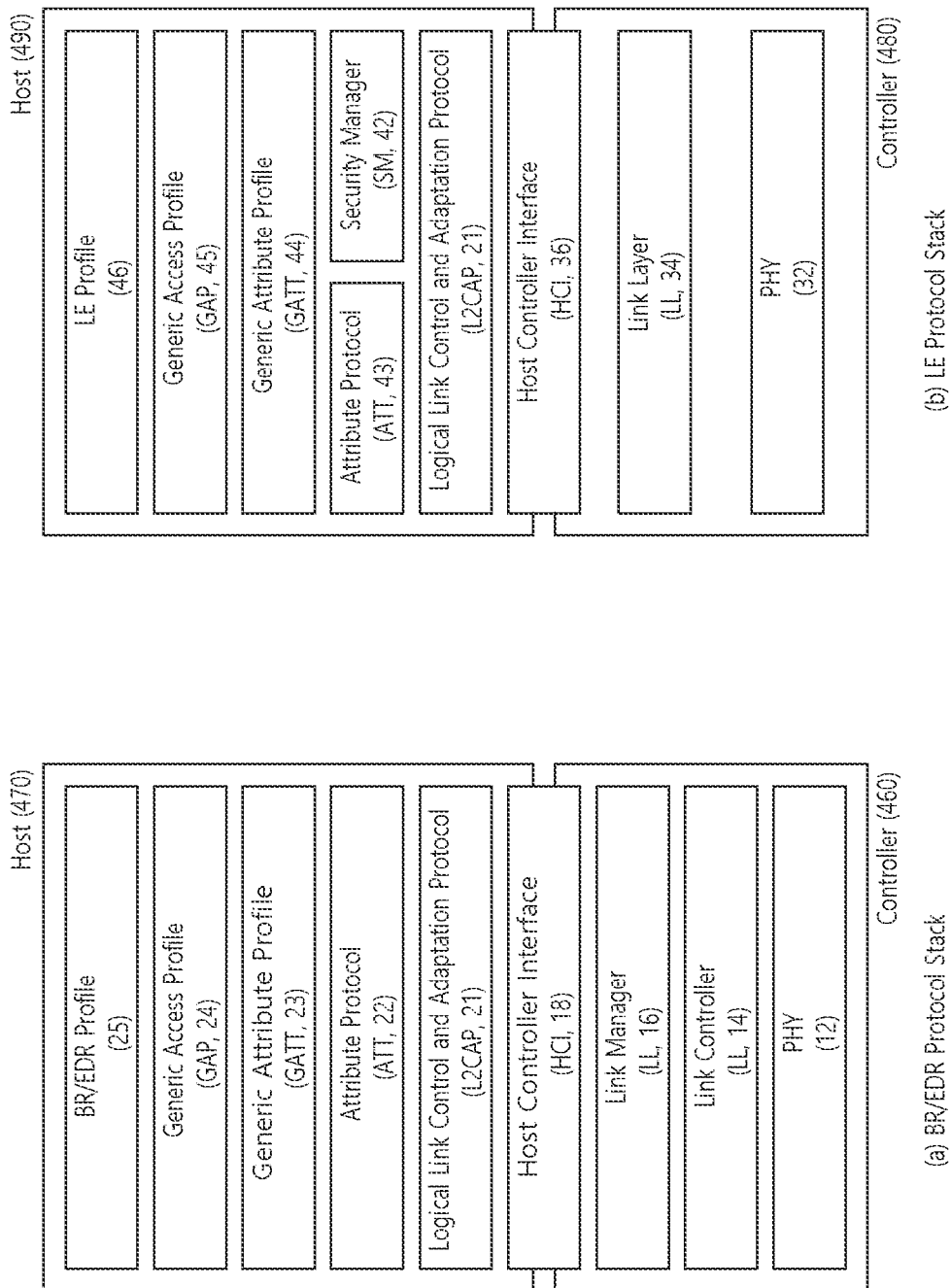

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

ACCESS CONTROL METHOD AND DEVICE IN WIRELESS POWER TRANSMISSION SYSTEM

CROSS-REFERENCE TO RELATED APPLICATIONS

This application is a National Stage application under 35 U.S.C. § 371 of International Application No. PCT/KR2020/001428, filed on Jan. 30, 2020, which claims the benefit of Korean Patent Application No. 10-2019-0065295, filed on Jun. 3, 2019. The disclosures of the prior applications are incorporated by reference in their entirety.

BACKGROUND OF THE DISCLOSURE

Field of the Disclosure

The present document relates to a wireless power transmitter and method using short-distance communication, and to a wireless power receiver and method, more particularly, it relates to a method for controlling access and communication between a wireless power transmitter and a plurality of wireless power receivers in a wireless power transmission system, and an apparatus for performing the same.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth® earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance. The magnetic induction method leads the standard in the wireless power consortium (WPC), and the magnetic resonance method leads the standard in the air fuel alliance (AFA).

According to the WPC standard, the wireless power transmitter and the wireless power receiver are designed to exchange various status information and commands related to the wireless power transmission system using in-band communication. However, since in-band communication is not a system designed specifically for communication, it is not suitable for high-speed and large-capacity information exchange and exchange of various information. Therefore, a method for exchanging information related to a wireless power transmission system by combining another wireless communication system (i.e., an out-band communication system) with the existing in-band communication is being discussed. Out of band communication includes, for example, short-range communication such as near field communication (NFC) and Bluetooth® communication.

Short-range communication, in particular, the core spec of Bluetooth® Specification V4.0 can be divided into BR/EDR (Basic Rate/Enhanced Data Rate) and LE (Low Energy). Among them, BR/EDR is a wireless communication technology applied to many products, occupying a dominant market position in short-range WPAN technology. Meanwhile, Bluetooth Low Energy® is a technology announced after the Bluetooth® standard document V4.0 and was designed with the goal of higher energy efficiency compared to the existing Bluetooth® BR/EDR.

When the wireless power receivers are placed close to the wireless power transmitter, the wireless power transmitter negotiates for power transmission suitable for each wireless power receiver. When the negotiation is completed, the wireless power transmitter transmits wireless power to a plurality of wireless power receivers, the wireless power transmitter and the plurality of wireless power receivers periodically exchange information necessary for wireless power transmission using out-band communication.

On the other hand, if out-band communication follows the Bluetooth® standard, the wireless power transmitter and receiver perform a role suitable for a scenario among the four roles defined by the Bluetooth® standard: Advertiser, Scanner, Master, and Slave. Here, the scenario may include, for example, initial connection, wireless charging after connection, wireless charging connection of a low-power device (e.g., a mobile phone), wireless charging connection of a medium-power device (e.g., a laptop), and the like. The Bluetooth® communication standard defines an advertiser role that periodically broadcasts an advertisement packet including device information (i.e. MAC address, device name, etc.). The Bluetooth® communication standard also defines the role of a scanner device to search for nearby advertiser devices. After Bluetooth® connection, the advertiser becomes the slave device and the scanner becomes the master device. However, a method of notifying the wireless power receiver of the number of devices capable of supporting a service by the wireless power transmitter has not been described in the prior art. Accordingly, in most cases, the wireless power transmitter transmits the service unavailable notification in a different way or does not notify it at all, depending on the implementation method.

SUMMARY OF THE DISCLOSURE

An object of the present document is to provide a method of notifying the maximum number of supported devices to a wireless power receiver when the wireless power transmitter operates as an advertiser. That is, the wireless power transmitter serving as the advertiser may inform the wireless power receiver of whether a service is available and/or the number of service support devices.

Another technical object of the present document is to provide a method of informing a wireless power receiver of the maximum number of supported devices when the wireless power transmitter operates as a scanner. That is, the wireless power transmitter serving as a scanner proposes a method of informing the wireless power receiver of whether a service is available and/or the number of service support devices.

Another technical object of the present document is to provide a method for reducing a handover time from in-band communication to out-band communication. According to this, the time required for a procedure of exchanging information through out-band communication after in-band communication can be shortened.

Another technical problem of the present document is to clearly define a shared mode operation. According to this, the rules of the wireless power transmitter and the wireless power receiver can become clear in the shared mode.

According to an aspect of the present document, a wireless power transmitter is provided. The wireless power transmitter may comprise a power conversion circuit, which has a plurality of primary coils, configured to transfer a wireless power to a wireless power receiver using a primary coil that forms a magnetic coupling with the wireless power receiver at an operating frequency and a communication/control circuit configured to perform an in-band communication with the wireless power receiver using the operating frequency, and perform an out-band communication with the wireless power receiver using a frequency other than the operating frequency, the communication/control circuit is configured to transmit information informing whether a connection is possible to the wireless power receiver using the out-band communication.

In an aspect, the information informing whether the connection is possible may include at least one of information for a number of wireless power receivers connected to the wireless power transmitter, information for a maximum number of connectable wireless power receivers, or information for whether it is possible to support a service.

In another aspect, the information informing whether the connection is possible may be included in an advertising packet transmitted by the wireless power transmitter.

In other aspects, the advertising packet may be transmitted after receiving an identification packet and before receiving a configuration packet from the wireless power receiver.

In other aspects, if it is possible for the wireless power transmitter to connect with N wireless power receivers, the communication/control circuit may be configured to transfer the wireless power to N−1 wireless power receivers and to transmit a service support unavailable message to an N-th wireless power receiver.

In other aspects, the service support unavailable message may be transmitted to the N-th wireless power receiver through the out-band communication after connection with the N-th wireless power receiver According to another aspect of the present document, a wireless power receiver is provided. The wireless power receiver may comprise a power pickup circuit configured to receive a wireless power from a wireless power transmitter by a magnetic coupling with the wireless power transmitter having a primary coil at an operating frequency, and convert an AC signal generated by the wireless power into a DC signal, a communication circuit configured to perform an in-band communication with the wireless power transmitter using the operating frequency, and perform an out-band communication with the wireless power transmitter or other device using a frequency other than the operating frequency, and a control circuit configured to control an overall operation of the wireless power receiver, the control circuit is configured to determine whether a connection with the wireless power transmitter is possible based on information on whether the connection is possible received from the wireless power transmitter.

In an aspect, the information informing whether the connection is possible may include at least one of information for a number of wireless power receivers connected to the wireless power transmitter, information for a maximum number of connectable wireless power receivers, or information for whether it is possible to support a service.

In another aspect, the information informing whether the connection is possible may be included in an advertising packet received from the wireless power transmitter.

In other aspects, the advertising packet may be transmitted after transmitting an identification packet and before transmitting a configuration packet by the wireless power receiver.

In other aspects, if a service support unavailable message is received from the wireless power transmitter, the control circuit may be configured to terminate the out-band communication with the wireless power transmitter.

According to another aspect of the present document, a wireless power transmitter is provided. The wireless power transmitter may comprise a power conversion circuit, which has a plurality of primary coils, configured to transfer a wireless power to a wireless power receiver using a primary coil that forms a magnetic coupling with the wireless power receiver at an operating frequency and a communication/control circuit configured to perform an in-band communication with the wireless power receiver using the operating frequency, and perform an out-band communication with the wireless power receiver using a frequency other than the operating frequency, the communication/control circuit is configured to control the wireless power transmitter to terminate transmitting an advertising packet in a case where the wireless power transmitter is connected to an N-th wireless power receiver, when the wireless power transmitter is possible to connect with up to N wireless power receivers and operates as an advertiser.

In a wireless power transmission system, a wireless power transmitter can efficiently connect with a plurality of wireless power receivers, the time taken from initial connection to wireless power transmission may be reduced.

BRIEF DESCRIPTION OF THE DRAWINGS

FIG. 3*b* is a diagram illustrating an example of WPC NDEF in a wireless power transmission system.

FIG. 4*b* is a diagram illustrating an example of a Bluetooth® communication architecture to which the present disclosure can be applied.

FIG. 10 is a structure of a sync pattern according to an exemplary embodiment of the present disclosure.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
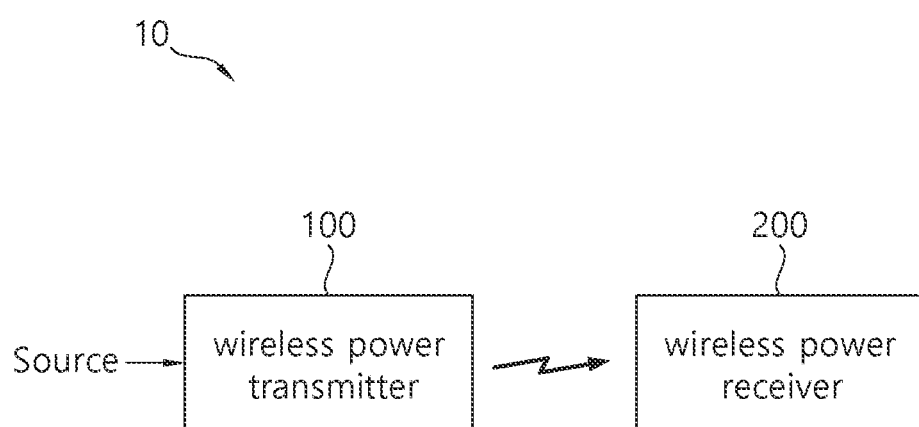
FIG. 1 is a block diagram of a wireless power transmission system 10 according to an embodiment.
Figure 2:
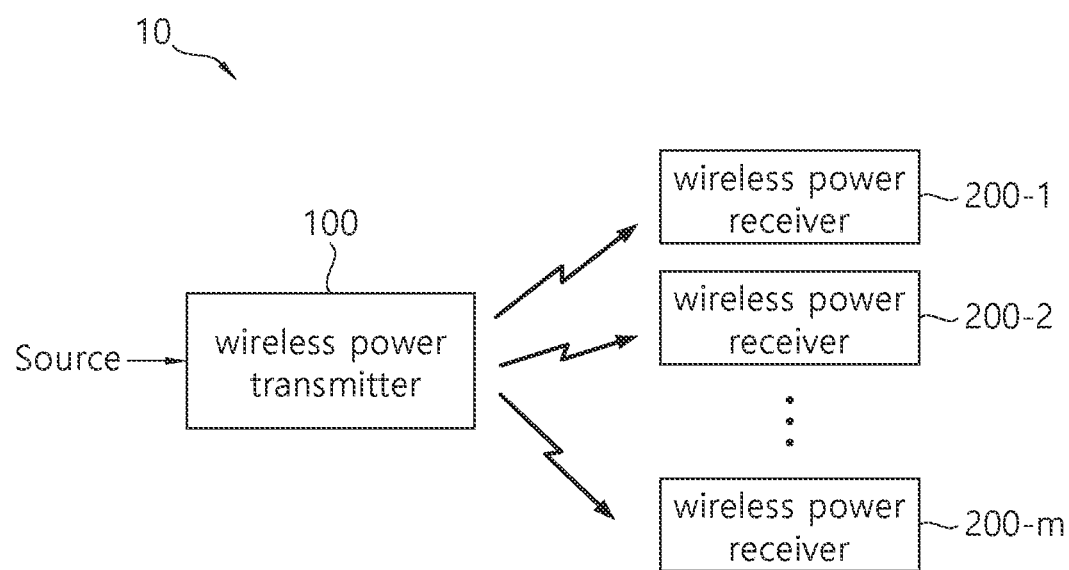
FIG. 2 is a block diagram of a wireless power transmission system 10 according to another embodiment.

FIG. 1 is a block diagram of a wireless power transmission system 10 according to an embodiment, and FIG. 2 is a block diagram of a wireless power transmission system 10 according to another embodiment.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth®, Bluetooth Low Energy®, and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
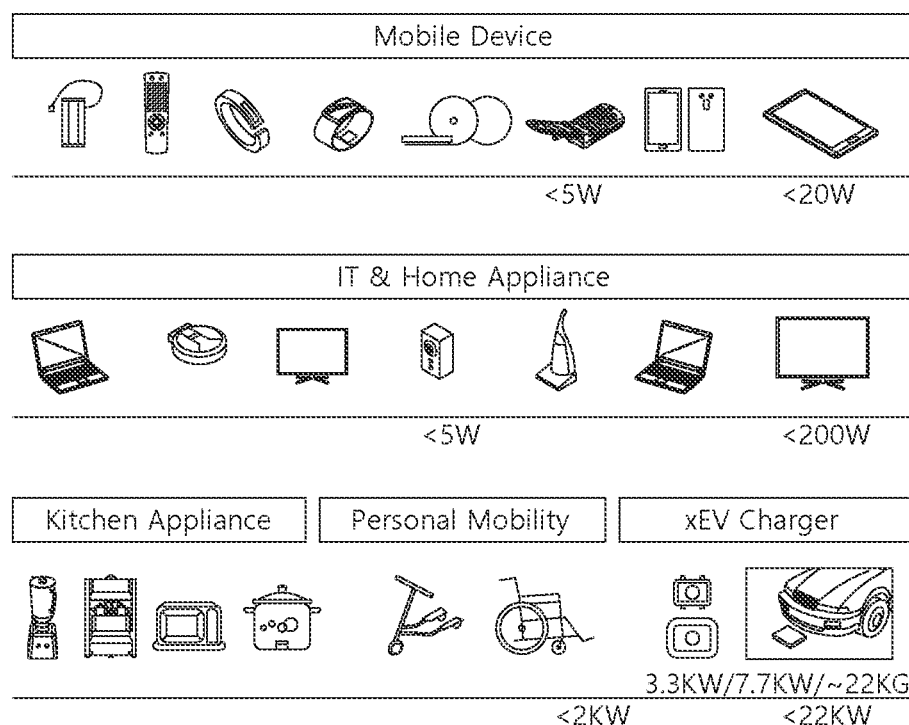
FIG. 3a is a diagram illustrating an embodiment of various electronic devices to which a wireless power transmission system is introduced.

FIG. 3a is a diagram illustrating an embodiment of various electronic devices to which a wireless power transmission system is introduced, and FIG. 3b is a diagram illustrating an example of WPC NDEF in a wireless power transmission system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately SOW or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of SW, and the EPP is related to a wireless power transmitter and a wireless power receiver supporting the transfer of a power range greater than SW and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OOB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth®. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). For example, referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 4A:
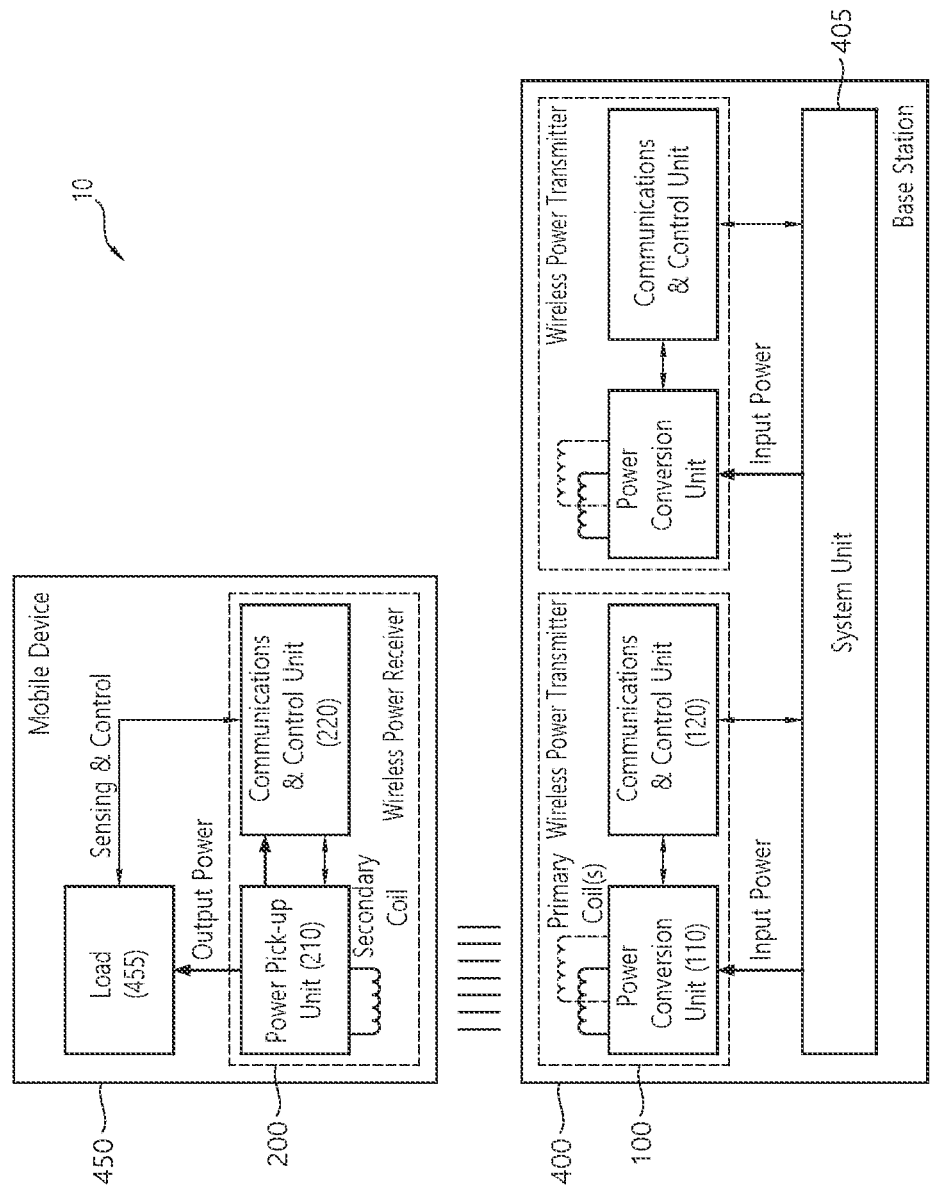
FIG. 4*a* is a block diagram of a wireless power transmission system according to another embodiment.

As shown in Table 1, a maximum output power capability of Class n PTU may be equal to or greater than the PTX_IN_MAX of the corresponding class. The PRU cannot draw a power that is higher than the power level specified in the corresponding category. FIG. 4a is a block diagram of a wireless power transmission system according to another embodiment, and FIG. 4b is a diagram illustrating an example of a Bluetooth® communication architecture to which the present disclosure can be applied.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on. Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth®, Bluetooth Low Energy®, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and receive information using a magnetic wave having a specific frequency as a center frequency. For example, the communication/control circuit 120 may perform in-band communication by loading information on a magnetic wave and transmitting it through a primary coil or by receiving a magnetic wave containing information through a primary coil. At this time, using a modulation method such as binary phase shift keying (BPSK), Frequency Shift Keying (FSK) or amplitude shift keying (ASK) and a coding method such as Manchester coding or non-return-to-zero level (NZR-L) coding, it can contain information in magnetic waves or interpret magnetic waves containing information. If such IB communication is used, the communication/control circuit 120 may transmit/receive information up to a distance of several meters at a data rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth®, Bluetooth Low Energy®, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth®, Bluetooth Low Energy®, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and receive information using a magnetic wave having a specific frequency as a center frequency. For example, the communication/control circuit 220 may perform in-band communication by loading information on a magnetic wave and transmitting it through a primary coil or by receiving a magnetic wave containing information through a primary coil. At this time, using a modulation method such as binary phase shift keying (BPSK), Frequency Shift Keying (FSK) or amplitude shift keying (ASK) and a coding method such as Manchester coding or non-return-to-zero level (NZR-L) coding, it can contain information in magnetic waves or interpret magnetic waves containing information. If such IB communication is used, the communication/control circuit 220 may transmit/receive information up to a distance of several meters at a data rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth®, Bluetooth Low Energy®, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

When the communication/control circuit 120 and the communication/control circuit 220 are Bluetooth® or Bluetooth Low Energy® as an OOB communication module or a short-range communication module, the communication/control circuit 120 and the communication/control circuit 220 may each be implemented and operated with a communication architecture as shown in FIG. 4b.

Referring to FIG. 4b, an example of a protocol stack of Bluetooth® BR (Basic Rate)/EDR (Enhanced Data Rate) and Bluetooth Low Energy® supporting GATT is illustrated.

Specifically, the Bluetooth® BR/EDR protocol stack may include an upper control stack 460 and a lower host stack 470 based on a host controller interface (HCI) 18.

The host stack (or host module) 470 refers to hardware for transmitting or receiving a Bluetooth® packet to or from a wireless transmission/reception module which receives a Bluetooth® signal of 2.4 GHz, and the controller stack 460 is connected to the Bluetooth® module to control the Bluetooth® module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth® connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth®.

L2CAP of Bluetooth® BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth® BR/EDR and an application protocol for exchanging these data, and the generic access profile (GAP) 24 defines device discovery, connectivity, and security level.

Next, the Bluetooth Low Energy® protocol stack includes a controller stack 480 operable to process a wireless device interface important in timing and a host stack 490 operable to process high level data.

First, the controller stack 480 may be implemented using a communication module that may include a Bluetooth® wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth® packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an Bluetooth Low Energy® profile 46. However, the host stack 490 is not limited thereto and may include various protocols and profiles.

The host stack multiplexes various protocols, profiles, etc., provided from upper Bluetooth® using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth Low Energy®, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth Low Energy® technology, is used to select a role for communication between Bluetooth Low Energy® devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The Bluetooth Low Energy® profile 46, including profiles dependent upon the GATT, is mainly applied to a Bluetooth Low Energy® device. The Bluetooth Low Energy® profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth Low Energy® technology will be briefly described.

The Bluetooth Low Energy® procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the Bluetooth Low Energy®, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth® connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other Bluetooth Low Energy® device in the Bluetooth Low Energy® piconet.

If the scanning device is in an initiator mode in which the scanning device may receive an advertising event and initiates a connection request. The scanning device may transmit a connection request to the advertising device through the advertising physical channel to start a Bluetooth® connection with the advertising device.

When the scanning device transmits a connection request to the advertising device, the scanning device stops the initiator mode scanning for additional broadcast and enters the connected mode.

Discovering Procedure

Devices available for Bluetooth® communication (hereinafter, referred to as "Bluetooth® devices") perform an advertising procedure and a scanning procedure in order to discover devices located nearby or in order to be discovered by other devices within a given area.

The discovering procedure is performed asymmetrically. A Bluetooth® device intending to discover other device nearby is termed a discovering device, and listens to discover devices advertising an advertising event that may be scanned. A Bluetooth® device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth® devices in a piconet.

Connecting Procedure

A connecting procedure is asymmetrical, and requests that, while a specific Bluetooth® device is performing an advertising procedure, another Bluetooth® device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the Bluetooth Low Energy® technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth® interface will be briefly described. Bluetooth Low Energy® devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONDIRECT_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.
    ADV_IND: Connectable undirected advertising event
    ADV_DIRECT_IND: Connectable directed advertising event
    ADV_NONCONN_IND: Unconnectable undirected advertising event
    ADV_SCAN_IND: Scannable undirected advertising event
    The PDUs are transmitted from the LL in an advertising state, and received by the LL in a scanning state or in an initiating state.

Scanning PDU

The following advertising channel DPU types are termed scanning PDUs and are used in a state described hereinafter.
    SCAN_REQ: Transmitted by the LL in a scanning state and received by the LL in an advertising state.
    SCAN_RSP: Transmitted by the LL in the advertising state and received by the LL in the scanning state.

Initiating PDU

The following advertising channel PDU type is termed an initiating PDU.
    CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the Bluetooth Low Energy® technology discussed above may be applied to perform the methods proposed in the present disclosure.

Referring to FIG. 4a, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
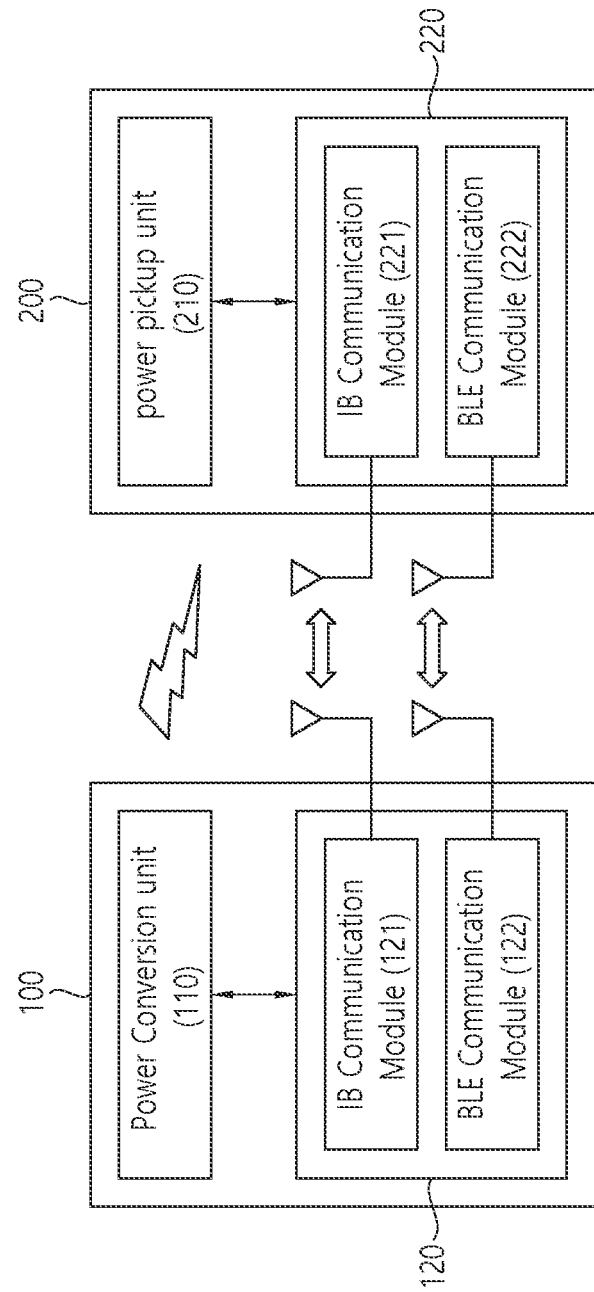
FIG. 4*c* is a block diagram illustrating a wireless power transmission system using Bluetooth Low Energy® communication according to an example.

When the communication/control circuit 120 and the communication/control circuit 220 include Bluetooth® or Bluetooth Low Energy® as an OOB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4c.

Figure 4D:
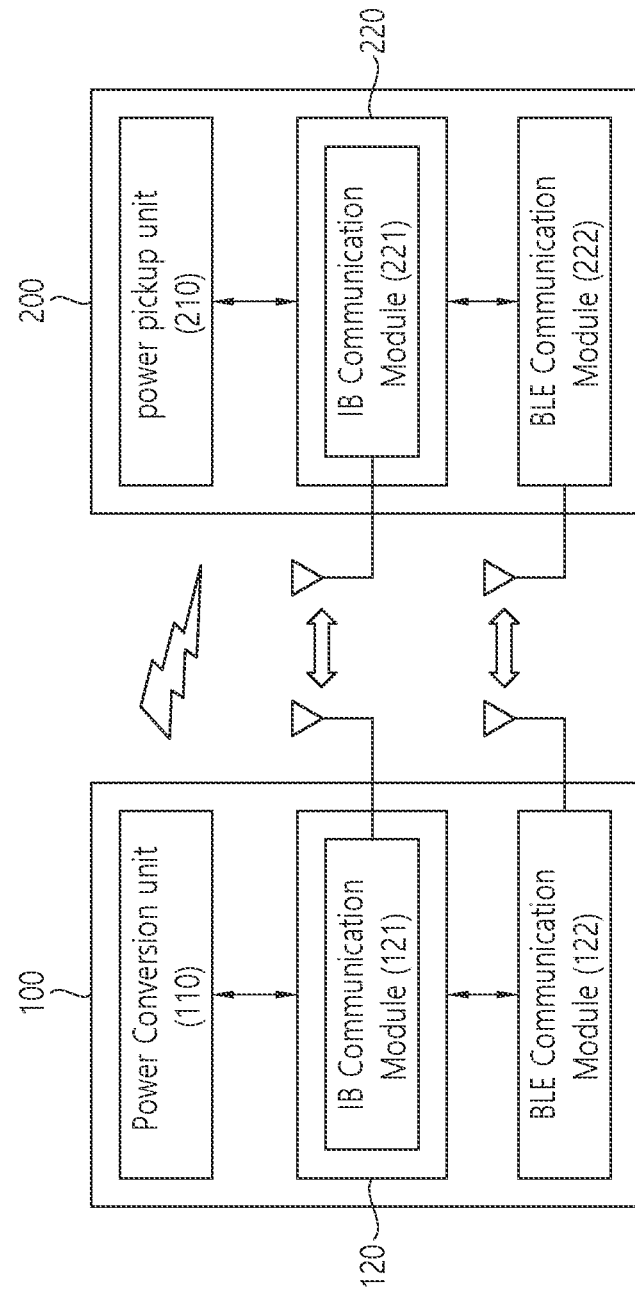
FIG. 4*d* is a block diagram illustrating a wireless power transmission system using Bluetooth Low Energy® communication according to another example.

FIG. 4c is a block diagram illustrating a wireless power transmission system using Bluetooth Low Energy® communication according to an example, and FIG. 4d is a block diagram illustrating a wireless power transmission system using Bluetooth Low Energy® communication according to another example.

Referring to FIG. 4c, the wireless power transmitter 100 includes a power conversion circuit 110 and a communication/control circuit 120. The communication/control circuit 120 includes an in-band communication module 121 and a Bluetooth Low Energy® communication module 122.

Meanwhile, the wireless power receiver 200 includes a power pickup circuit 210 and a communication/control circuit 220. The communication/control circuit 220 includes an in-band communication module 221 and a Bluetooth Low Energy® communication module 222.

In one aspect, the Bluetooth Low Energy® communication modules 122 and 222 perform the architecture and operation according to FIG. 4B. For example, the Bluetooth Low Energy® communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using Bluetooth Low Energy® transmission.

Meanwhile, the communication/control circuits 120 and 220 respectively include only in-band communication modules 121 and 221 as like FIG. 4d, and the Bluetooth Low Energy® communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Hereinafter, the coil or coil unit includes a coil and at least one device being approximate to the coil, and the coil or coil unit may also be referred to as a coil assembly, a coil cell, or a cell.

Figure 5:
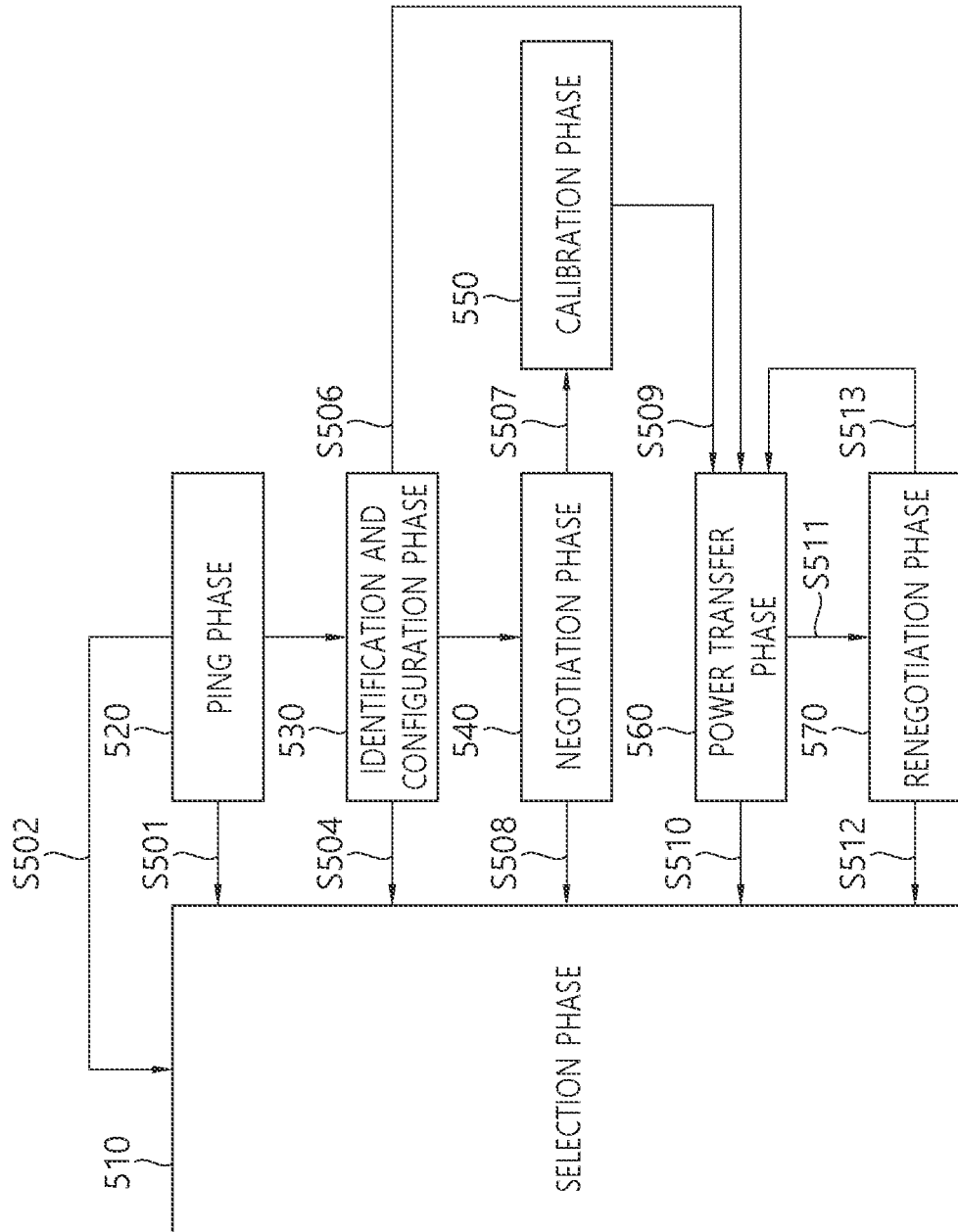
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S501, S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping of an extremely short pulse, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may determine whether it is necessary to enter the negotiation step 540 based on the negotiation field value of the configuration packet received in the identification and configuration step 530. As a result of the check, if negotiation is necessary, the wireless power transmitter may enter a negotiation step 540 to perform a predetermined Foreign Object Detection (FOD) procedure. On the other hand, as a result of the check, if negotiation is not necessary, the wireless power transmitter may directly enter the power transmission step 560. If the line power transmitter and receiver support out-band communication such as Bluetooth Low Energy®, in the identification and configuration step 530, the out-band communication module of the wireless power transmitter receives the ID or identification packet of the wireless power receiver, and sends and receives messages related to configurations necessary for power transmission.

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD by applying the estimated power loss.

When the wireless power transmitter and the receiver support out-band communication such as Bluetooth Low Energy®, in the correction step 550, the in-band communication modules of the wireless power transmitter and the wireless power receiver may exchange information necessary for a foreign material detection algorithm according to the charging profile.

In addition, when the wireless power transmitter and the receiver support out-band communication such as Bluetooth Low Energy®, in the negotiation step 540, the connected Bluetooth Low Energy® communication may be used to exchange and negotiate information related to wireless power transmission. And when the exchange of information related to wireless power transmission through Bluetooth Low Energy® during the negotiation step 540 is completed, the out-band communication module may notify the in-band communication module (or control circuit) of this and transmit a start power transfer message instructing the start of wireless power transfer to the in-band communication module (or control circuit).

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
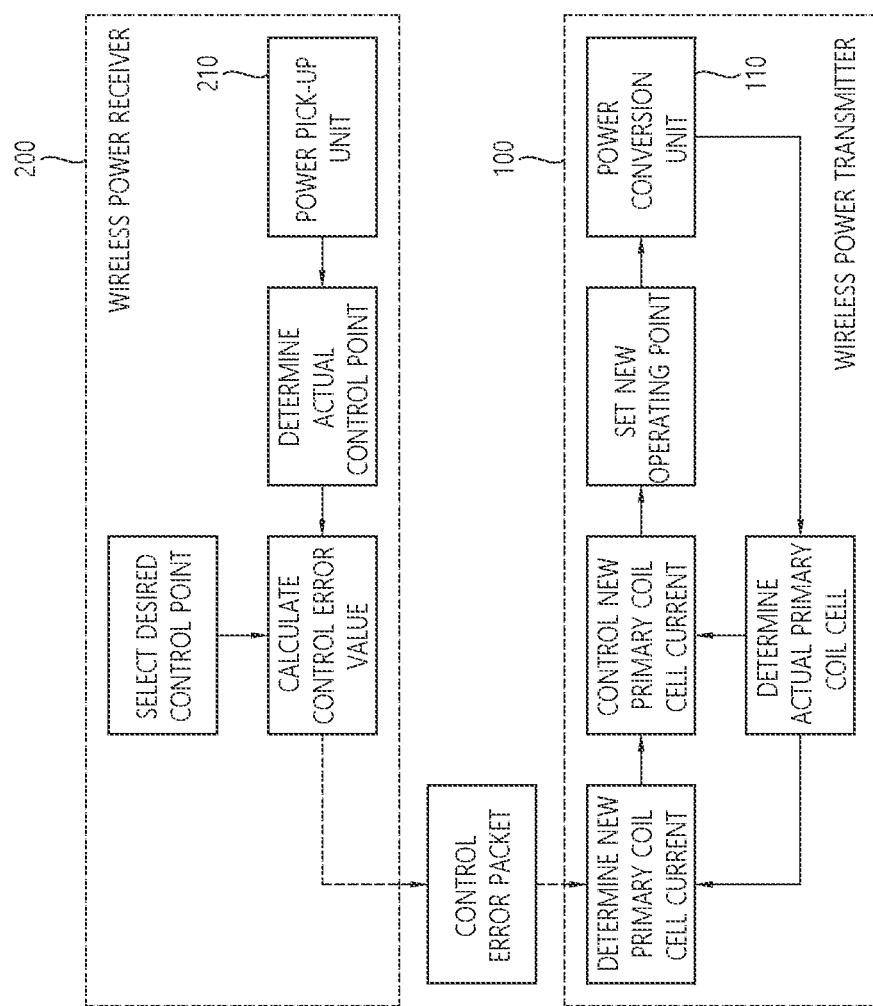
FIG. 6 is a diagram illustrating a power control method according to an embodiment.

FIG. 6 is a diagram illustrating a power control method according to an embodiment.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
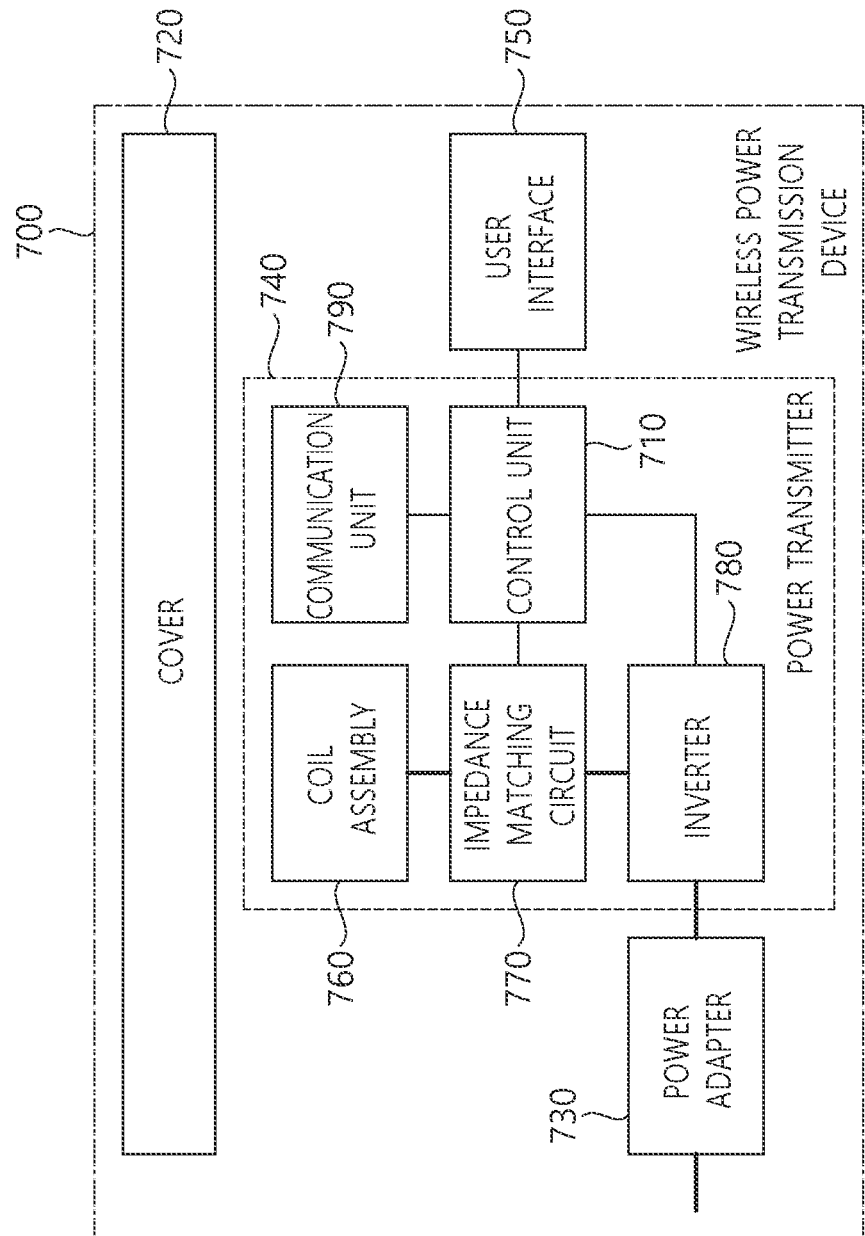
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

For example, the impedance matching circuit 770 may be composed of a total of four inverters for power conversion for each coil, and receives a PWM signal from the control circuit 710. Impedance matching circuit 770 is driven by passing a signal to the inverter through two 4-channel logic switches.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

The communication circuit 790 may include any one or both of an in-band communication module and an out-band communication module. The communication circuit 790 is configured to search for a wireless power receiver or to transmit data to the wireless power receiver. Here, the communication circuit 790 may be configured to perform a procedure related to authentication of the wireless power receiver. Here, authentication includes Qi authentication. For example, the communication circuit 790 may receive authentication-related information from the wireless power receiver or transmit authentication-related information to the wireless power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
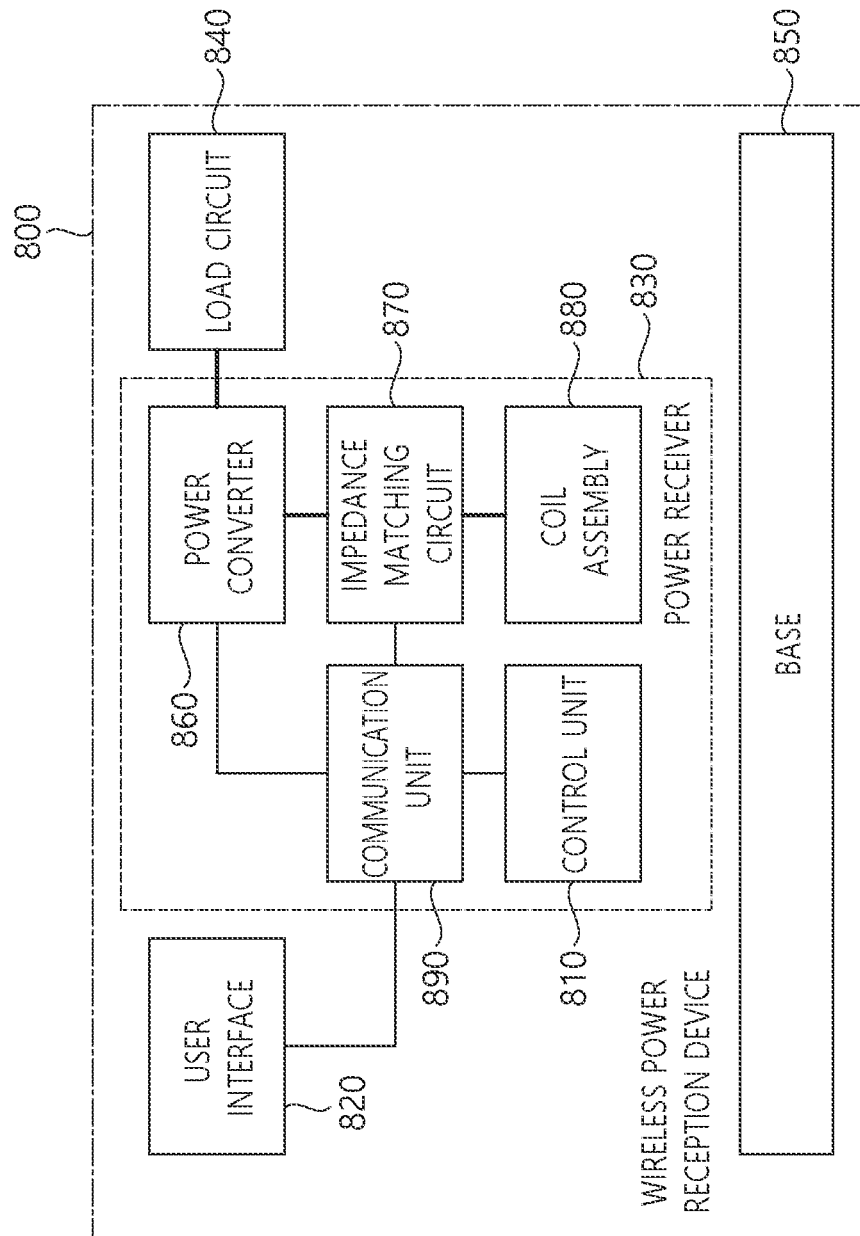
FIG. 8 is a block diagram of an apparatus for receiving wireless power according to another embodiment.

FIG. 8 is a block diagram of an apparatus for receiving wireless power according to another embodiment. This may belong to a wireless power transmission system of a magnetic resonance method or a shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. Alternatively, the impedance matching circuit 870 may be composed of a total of four inverters for power conversion for each coil, and receives a PWM signal from the control circuit 810. Impedance matching circuit 870 is driven by passing a signal to the inverter through two 4-channel logic switches.

In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter. For this, the power receiver (830) may perform switching of the resistance or capacitor so as to change the reflected impedance.

The communication circuit 890 may include any one or both of an in-band communication module and an out-band communication module. The communication circuit 890 is configured to search for a wireless power transmitter or to transmit data to the wireless power transmitter. Here, the communication circuit 890 may be configured to perform a procedure related to authentication of the wireless power transmitter. Here, authentication includes Qi authentication. For example, the communication circuit 890 may receive authentication-related information from or transmit to the wireless power transmitter.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed. The control circuit 810 may be configured to perform a procedure related to authentication of the wireless power receiver. Here, authentication includes Qi authentication.

The communication unit (890) and the control unit (810) may each be provided as a separate device/chipset or may be collectively provided as one device/chipset.

Figure 9:
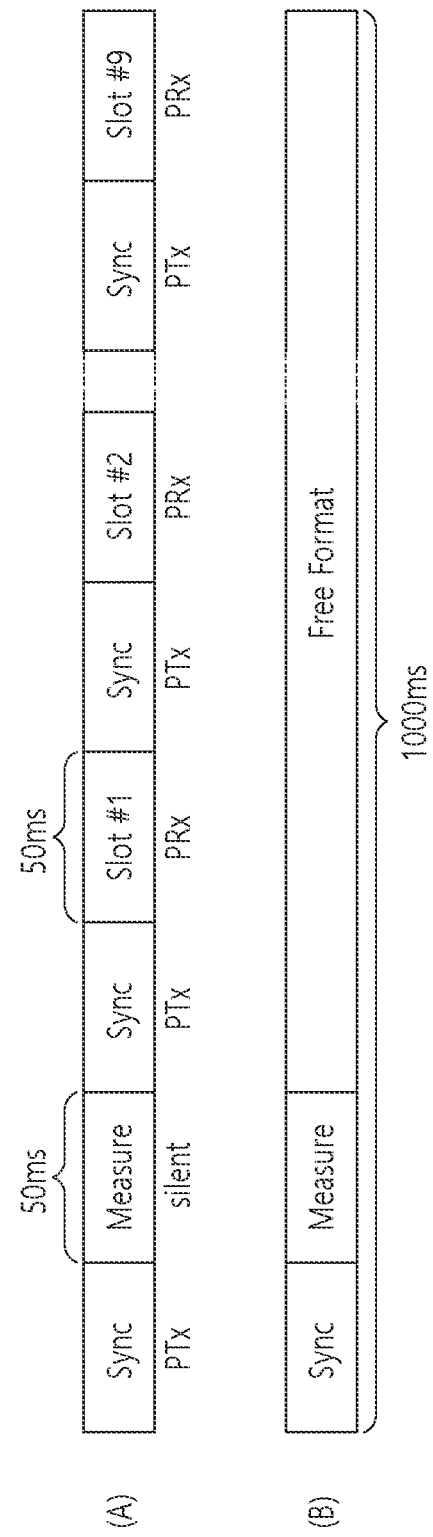
FIG. 9 is a diagram illustrating a communication frame structure according to an embodiment.

FIG. 9 is a diagram illustrating a communication frame structure according to an embodiment. This may be a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
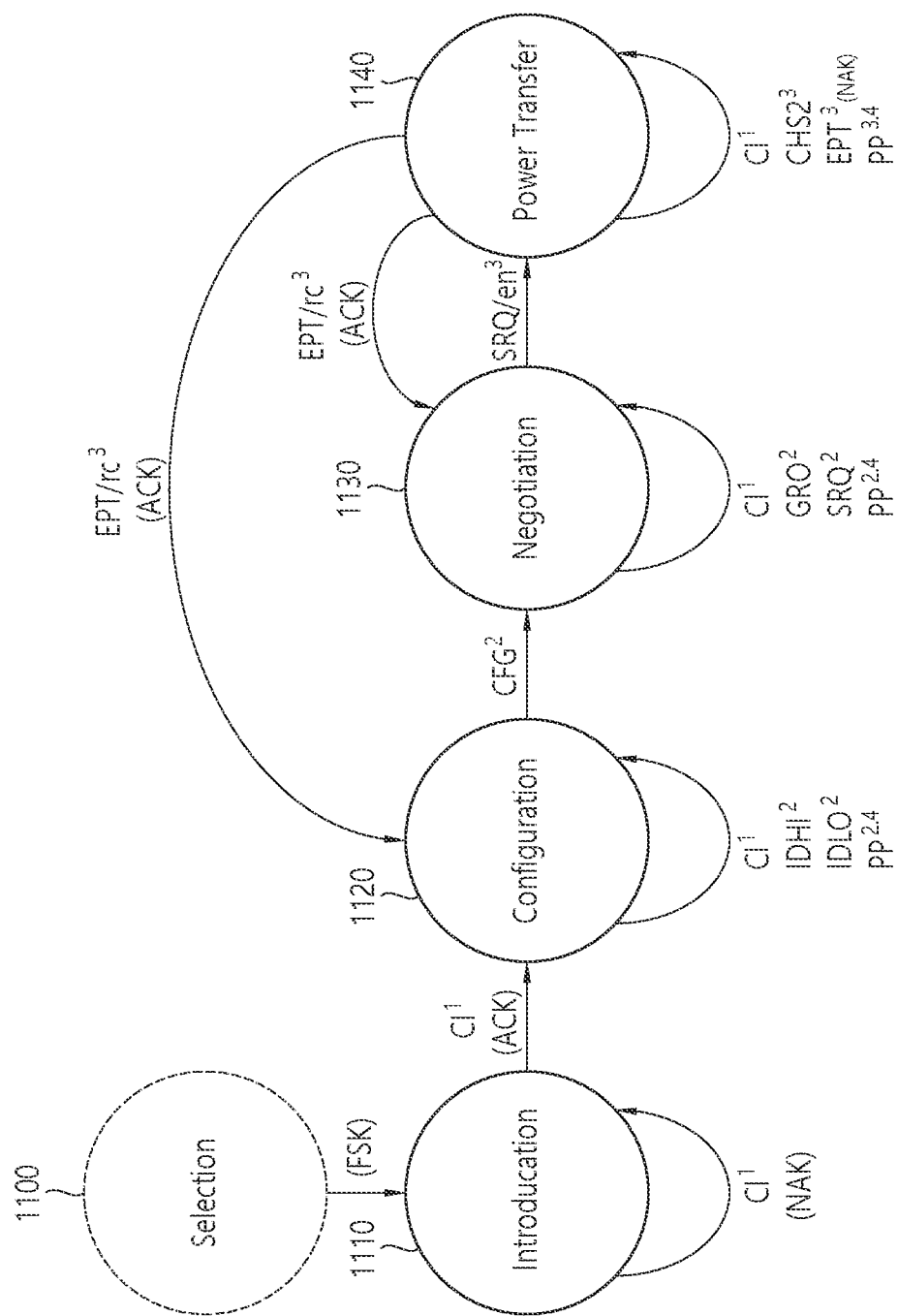
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, a switching operation between in-band communication and out-band communication is referred to as a handover. In particular, the operation in which the wireless power transmitter and the wireless power receiver switch from in-band communication to out-band communication is called handover to out-band, the operation in which the wireless power transmitter and the wireless power receiver switch from out-band communication to in-band communication is called handover to in-band. Out-band communication may include, for example, Bluetooth® or Bluetooth Low Energy®, or NFC. The handover connection procedure may include a procedure for establishing an out-band communication connection when the out-band communication (i.e. Bluetooth Low Energy®) module receives a handover message from the in-band communication module. Here, the handover message may be a message instructing the in-band communication module (or control unit) to initiate a wireless connection for exchanging information related to wireless power transmission to the out-band communication module.

In order for out-band communication to be applied to the wireless power transmission system, it needs to be modified according to the unique characteristics of the wireless power transmission system. For example, in consideration of the characteristics of information (ex. whether it is urgent information, whether it is only transmitted when the status is changed, whether large amounts of information need to be exchanged in a short time, etc.) exchanged between the wireless power transmitter and the wireless power receiver, the message type, format, and procedures according to the existing out-band communication should be redesigned. Like this, by defining procedures for setting information, control information, management information and their exchange regarding wireless power transmission as an out-band communication protocol, various applications of wireless power can be supported.

Hereinafter, in this specification, out-band communication will be specifically described as Bluetooth Low Energy® by way of example. However, in the embodiments described based on Bluetooth Low Energy®, it is apparent to those skilled in the art that embodiments in which Bluetooth Low Energy® is replaced with other out-band communication also fall within the technical spirit of the present disclosure.

Figure 12:
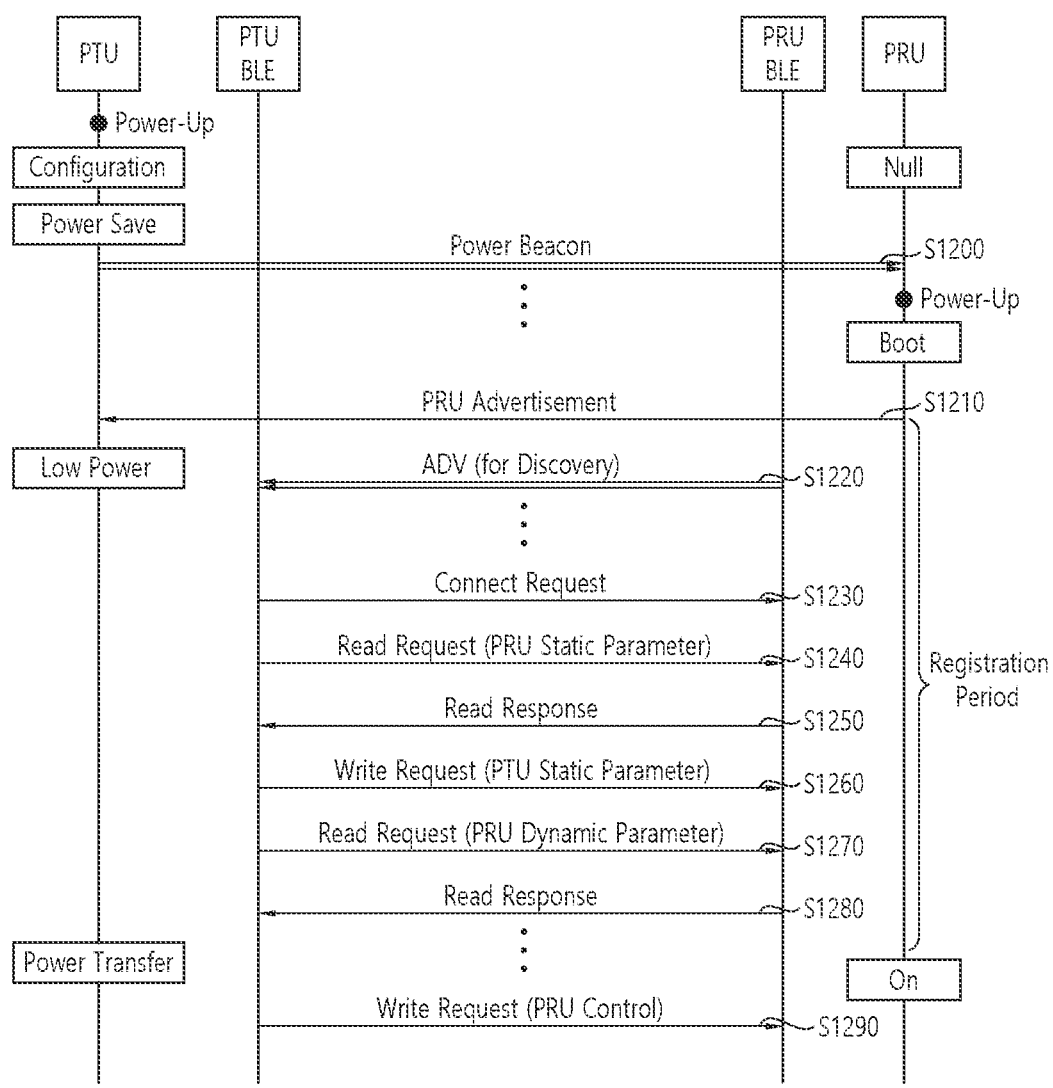
FIG. 12 is a flowchart illustrating a method of exchanging wireless charging-related information in an out-band or in-band by a wireless power transmitter and a wireless power receiver according to an embodiment.
Figure 13:
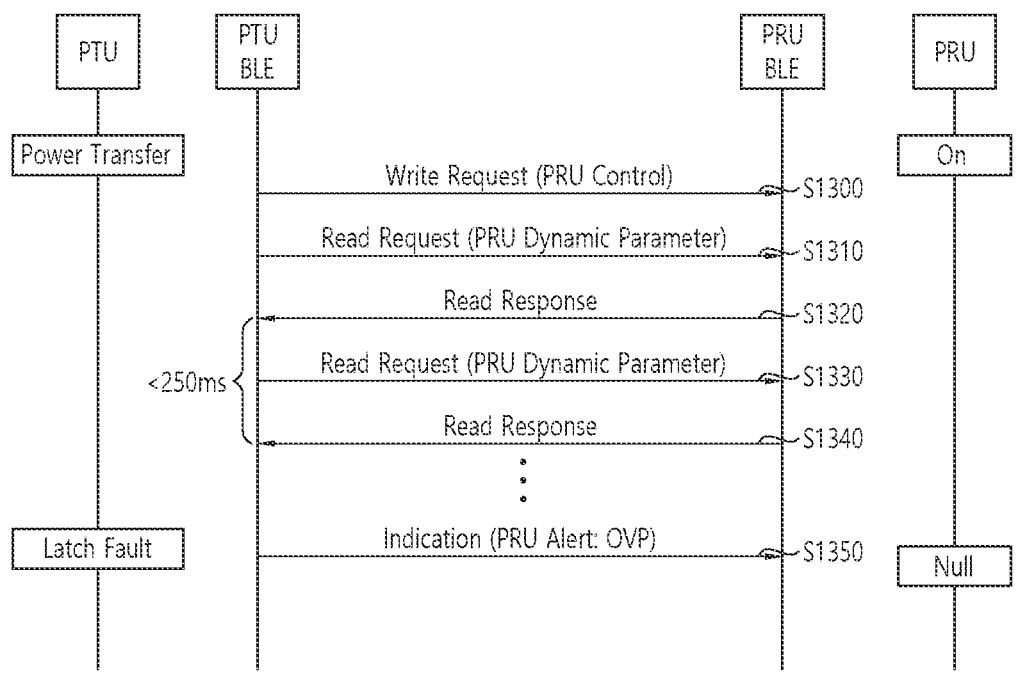
FIG. 13 is a flowchart illustrating a method by which the wireless power receiver notifies the wireless power transmitter of an error according to an embodiment.

FIG. 12 is a flowchart illustrating a method of exchanging wireless charging-related information in an out-band or in-band by a wireless power transmitter and a wireless power receiver according to an embodiment, and FIG. 13 is a flowchart illustrating a method by which the wireless power receiver notifies the wireless power transmitter of an error according to an embodiment.

In FIGS. 12 and 13, PTU means a power transfer circuit, and PRU means a power receiving circuit. The information transmission method in FIGS. 12 and 13 may be a method according to Alliance for Wireless Power (A4WP) or AFA standard technology.

Referring to FIG. 12 first, when the power of the PTU is turned on, the PTU enters a power save state through a configuration state that is an initial configuration stage.

In the power save state, the PTU transmits a power beacon to the PRU (S1200). The power save state is maintained until the PTU receives an advertisement from the PRU.

When the power of the PRU is turned on and booted, the PRU sends a PRU advertisement (S1210). The PTU which receives the PRU advertisement enters a low power state.

When receiving an Advertising packet (ADV) for discovery from the Bluetooth Low Energy® module of the PRU (S1220), in the low power state, the Bluetooth Low Energy® module of the PTU transmits a connection request to the PRU to establish a Bluetooth Low Energy® connection with the PRU (S1230).

In a state where Bluetooth Low Energy® communication between the PTU and the PRU is possible, the PTU reads the PRU static parameters of the PRU through a read request and a read response message (S1240, S1250). Here, the PRU static parameter includes state information of the PRU.

In addition, the PTU transmits PTU static parameter information containing its capabilities information to the PRU through a write request message (S1260).

After exchanging static parameter information, the PTU periodically receives PRU dynamic parameter information measured in the PRU through a read request and a read response (S1270, S1280). Here, the PRU dynamic parameters include voltage information, current information, temperature information, and the like.

When the PTU informs the PRU to charge or controls the permission of the PRU, the PRU may perform PRU control using a write request (S1290).

Referring to FIG. 13, the PTU may control the PTU through a write request in the power transmission state (S1300). In addition, the PRU dynamic parameter may be received from the PRU through the read request message and the read response message (S1310 to S1340). The PTU may acquire the PRU dynamic parameters at a period of 250 ms.

If this operation is repeated and the PRU detects an error such as over voltage protection (OVP), the PTU transmits a PRU alert to the PTU through an indication message (S1350). When the PTU receives an indication message including a PRU alert, it enters the latch fault state.

Figure 14:
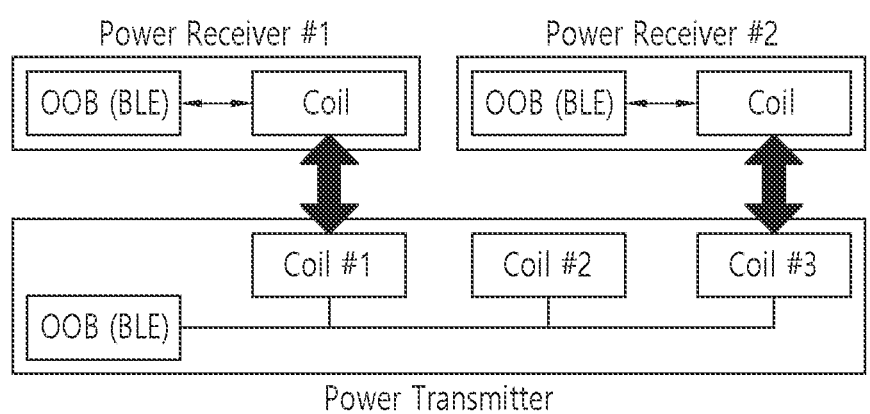
FIG. 14 is a diagram illustrating a situation in which a wireless power transmitter provides a power transmission service to a plurality of wireless power receivers.
Figure 15:
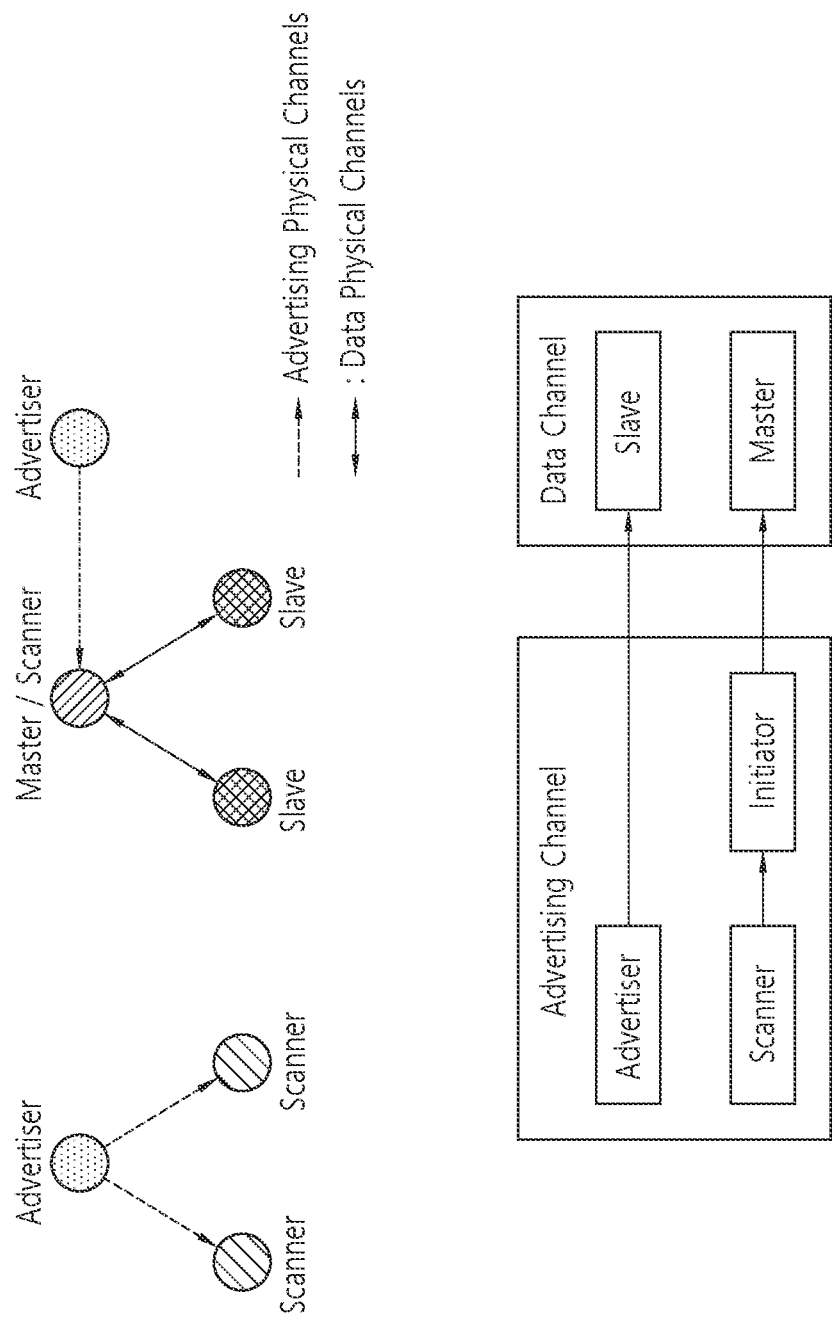
FIG. 15 is a diagram illustrating an operation of a Bluetooth® communication device.

FIG. 14 is a diagram illustrating a situation in which a wireless power transmitter provides a power transmission service to a plurality of wireless power receivers, and FIG. 15 is a diagram illustrating an operation of a Bluetooth® communication device.

Referring to FIG. 14, the wireless power transmitter may include a plurality of primary coils (i.e., multi-coils) to provide a power transmission service to a plurality of wireless power receivers. Meanwhile, referring to FIG. 15, the Bluetooth® communication standard defines an advertiser role that periodically broadcasts an advertisement packet including device information (i.e. MAC address, device name, identifier, etc.). In addition, the Bluetooth® communication standard defines the role of a scanner that searches for nearby advertiser devices.

Before Bluetooth® connection, the advertiser transmits an advertising packet to the scanner through the advertising channel, and after Bluetooth® connection, the advertiser device plays a slave role. The device, which was performing the scanner role, performs the initiator role when connecting with the Bluetooth®, and then performs the master role after connecting with the Bluetooth®. Slave and master exchange data through data channels.

The wireless power transmitter may be connected to a plurality of wireless power receivers using a Bluetooth Low Energy® module as an out-band communication module. In this case, the wireless power transmitter may operate as a scanner and then operate as a master after being connected to the wireless power receiver to manage the wireless power receiver. Alternatively, the wireless power transmitter may operate as an advertiser and then operate as a slave after being connected to the wireless power receiver to communicate with the wireless power receivers.

When the wireless power receiver (hereinafter referred to as PRx) for wireless charging is introduced or added (that is, when the PRx is placed close to the wireless power transmitter (hereinafter referred to as PTx)), the wireless power transmitter negotiates for power transmission suitable for each wireless power receiver. After the negotiation, when the power transfer contract is completed, the wireless power transmitter transmits wireless power to the wireless power receiver. At this time, information necessary for wireless power transmission is periodically exchanged through OOB communication between the wireless power transmitter and the wireless power receiver.

The wireless power transmitter and wireless power receiver perform appropriate roles and operations within scenarios such as initial connection, wireless charging after connection, wireless charging connection of a terminal (phone), and wireless charging connection of a laptop (Laptop). In each scenario, the wireless power transmitter and the wireless power receiver perform Bluetooth® communication. In this case, the wireless power transmitter and the wireless power receiver have roles defined in the Bluetooth® standard, in other words, it performs a role that fits the scenario among the four roles: Advertiser, Scanner, Master, and Slave.

However, in the prior art, there is no description of a method in which the wireless power transmitter informs the wireless power receiver of the number of serviceable devices. Therefore, depending on the implementation method, the wireless power transmitter may transmit a service unavailable notification in a different way or may not notify at all.

Hereinafter, a method of applying the role of Bluetooth® suitable for a wireless power transmitter and a wireless power receiver, and a stack structure related thereto will be described. Hereinafter, the Qi standard of WPC can be exemplified as a standard technology applied to this embodiment, the technical idea of the present document is to include embodiments of the wireless power transmitter and method, and the wireless power receiver and method based on the Qi standard as well as other standards.

Figure 16:
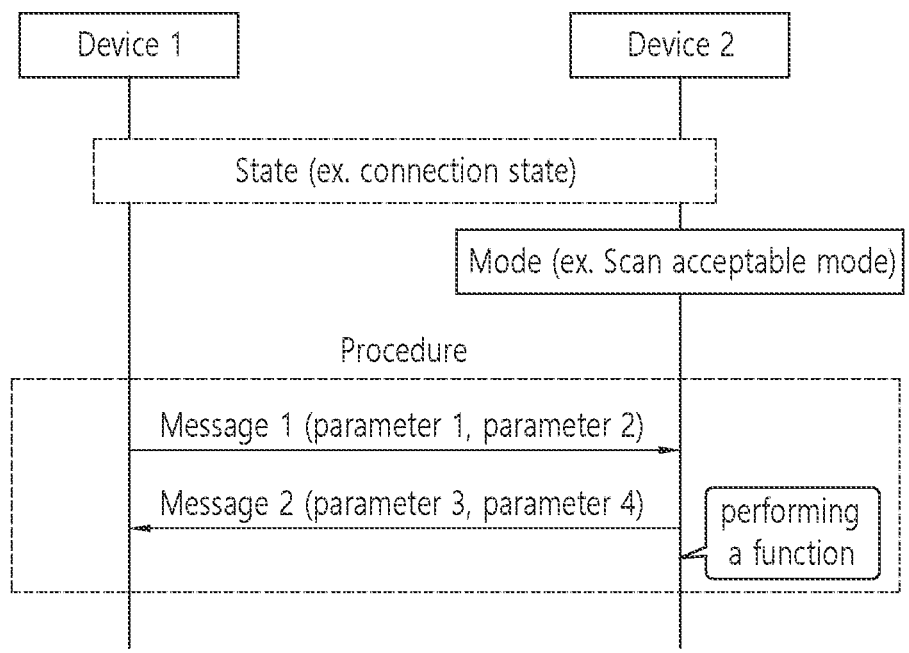
FIG. 16 is a diagram for explaining terms and procedures used in the present embodiment.

FIG. 16 is a diagram for explaining terms and procedures used in the present embodiment.

Hereinafter, a scan rule and scan procedure, a mode for reporting a scan result, and messages and parameters used in the scan procedure used in this embodiment for out-band communication will be described in detail. Here, the scan rule is to determine who performs the scan between the wireless power transmitter and at least one wireless power receiver. The components and features necessary to describe the present disclosure are summarized by category as follows.

Scan record: The scan record may mean information about a result of searching for a peripheral device using Bluetooth Low Energy® (e.g. device name, identifier, address, service information, etc.). If there are two out-band communication modules of the device having the corresponding information, sharing is possible through the scan record sharing message.

Scheduling sharing procedure: When the wireless power receiver operating as the master receives a collision (or retry request) notification from the wireless power transmitter, the wireless power receiver and the wireless power transmitter may perform scheduling sharing and change procedures.

Qi system device identification and service ID: Qi system device identification and service ID may refer to parameters including information indicating that a Qi system related service is provided. Here, the Qi system device may mean a device that has been certified for a specific standard (e.g., Qi). When the wireless power receiver receives information about the Qi system device identification and service ID, the wireless power receiver may ignore the information or perform a separate process.

Mode Interval: When the wireless power transmitter operates as a scanner or master (that is, when the wireless power receiver operates as an advertiser or slave), the wireless power receiver needs to operate as a scanner or a master for other Bluetooth® operations (e.g., connection with a nearby smart band, etc.) regardless of the wireless power transmission system. Therefore, in this case, the mode (or role) of the wireless power receiver (or Bluetooth® module) may be changed. A period in which the mode (or role) is changed in this way may be defined as a mode interval. The wireless power transmitter and the wireless power receiver may exchange and share information about the mode interval based on the mode interval sharing message.

In this embodiment, the wireless power transmitter and the wireless power receiver may be defined to operate according to the procedure according to FIG. 16 throughout the power transmission procedure and communication procedure.

Referring to FIG. 16, the first device and the second device operate in a specific state (State). For example, the specific state may include a connection state. Here, the connection state may mean a state in which a communication link between the first device and the second device is established. In this case, the first device may be a wireless power transmitter and the second device may be a wireless power receiver. Alternatively, the first device may be a wireless power receiver and the second device may be a wireless power transmitter. Alternatively, the first device may be a first wireless power receiver and the second device may be a second wireless power receiver.

In the first state, the first device or the second device enters a specific mode (Mode). Here, the specific mode may include a selection mode, an identification and configuration mode, a negotiation mode, a correction mode, a power transmission mode, a scan acceptable mode, and the like. That is, each phase in FIGS. 5 and 11 may be called a mode.

In a specific mode, a procedure for performing a specific function of wireless power transmission or communication between the first device and the second device may be performed (Procedure). For example, the procedure may include exchanging a first message and a second message. Each message may include parameters that the wireless power transmitter or wireless power receiver wants to transmit to the counterpart device.

Figure 17:
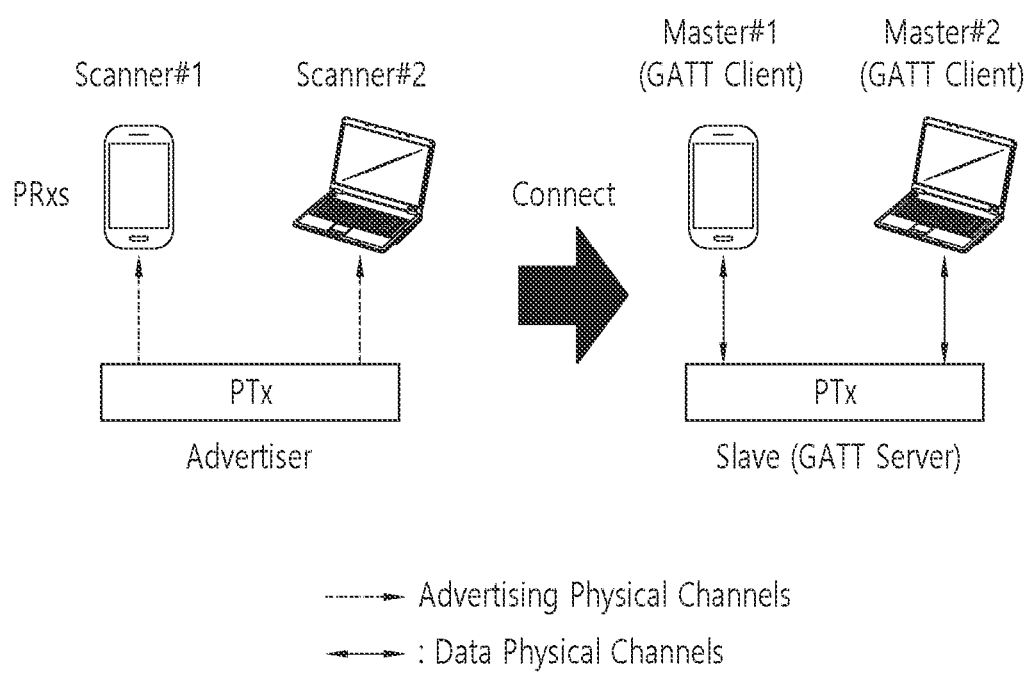
FIG. 17 is a diagram showing the structure of roles of a wireless power transmitter and a wireless power receiver according to an example.
Figure 18:
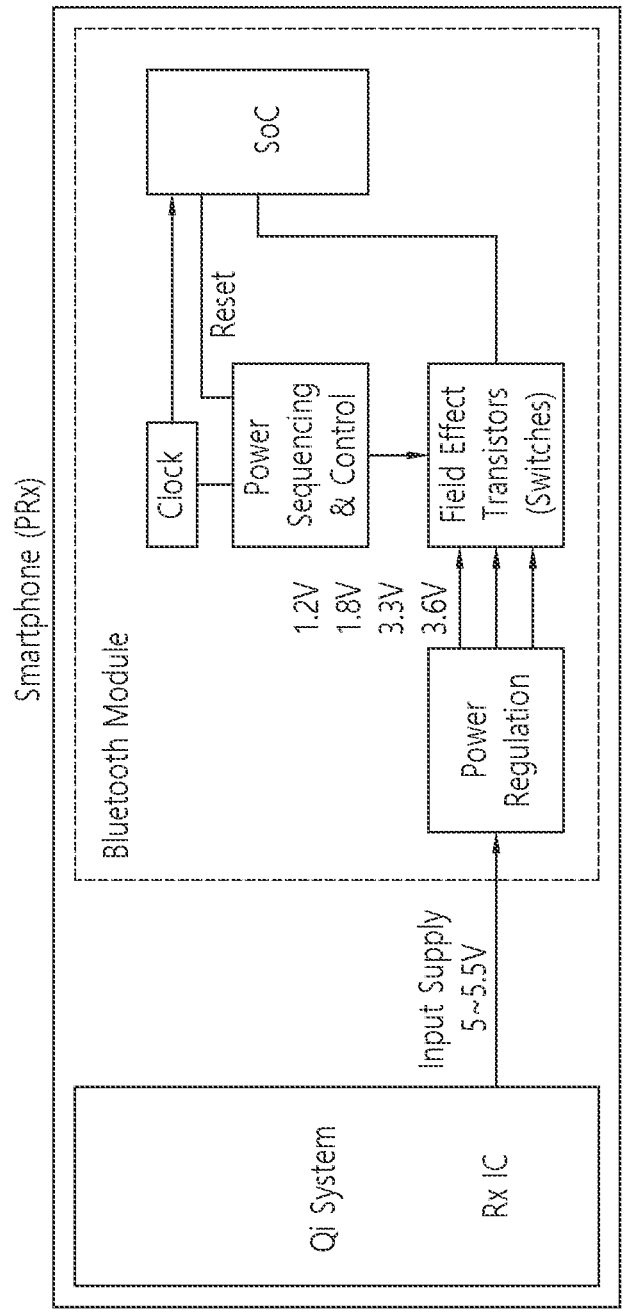
FIG. 18 is a hardware block diagram of the wireless power receiver according to an example.

FIG. 17 is a diagram showing the structure of roles of a wireless power transmitter and a wireless power receiver according to an example, and FIG. 18 is a hardware block diagram of the wireless power receiver according to an example.

Referring to FIG. 17, the wireless power transmitter (PTx) can transmit wireless power to N wireless power receivers (PRx), and supports the capability of performing communication with them. The wireless power transmitter may operate as an advertiser before being connected to the wireless power receiver, and may operate as a slave (GATT server) after being connected to the wireless power receiver. The wireless power receivers PRxs may operate as a scanner before being connected to the wireless power transmitter, and may operate as a master (GATT client) after being connected to the wireless power transmitter.

In this case, since a wireless power receiver such as a low-power device (e.g., a mobile phone) operates as a scanner in many use-cases using the Bluetooth Low Energy® function, when the wireless power receiver operates as in the role structure shown in FIG. 17, it is suitable to reuse the existing Bluetooth® hardware and software, and also it is possible to avoid collision with the existing role.

As shown in FIG. 18, the wireless power receiver does not use a dedicated Bluetooth® module for a wireless power transmission system (e.g., Qi system) for wireless power transmission, and the existing Bluetooth® module of the mobile phone can be used. In this case, the wireless power receiver of the wireless power transmission system can output 5 to 5.5V, the out-band communication module (i.e., the Bluetooth® module) can perform and operate by receiving the voltage of 5 to 5.5V as an input voltage. At this time, if the existing operation method of the wireless power receiver operates as a scanner/master, a software stack configured like a protocol stack in the FIG. 4 may be reused.

Figure 19:
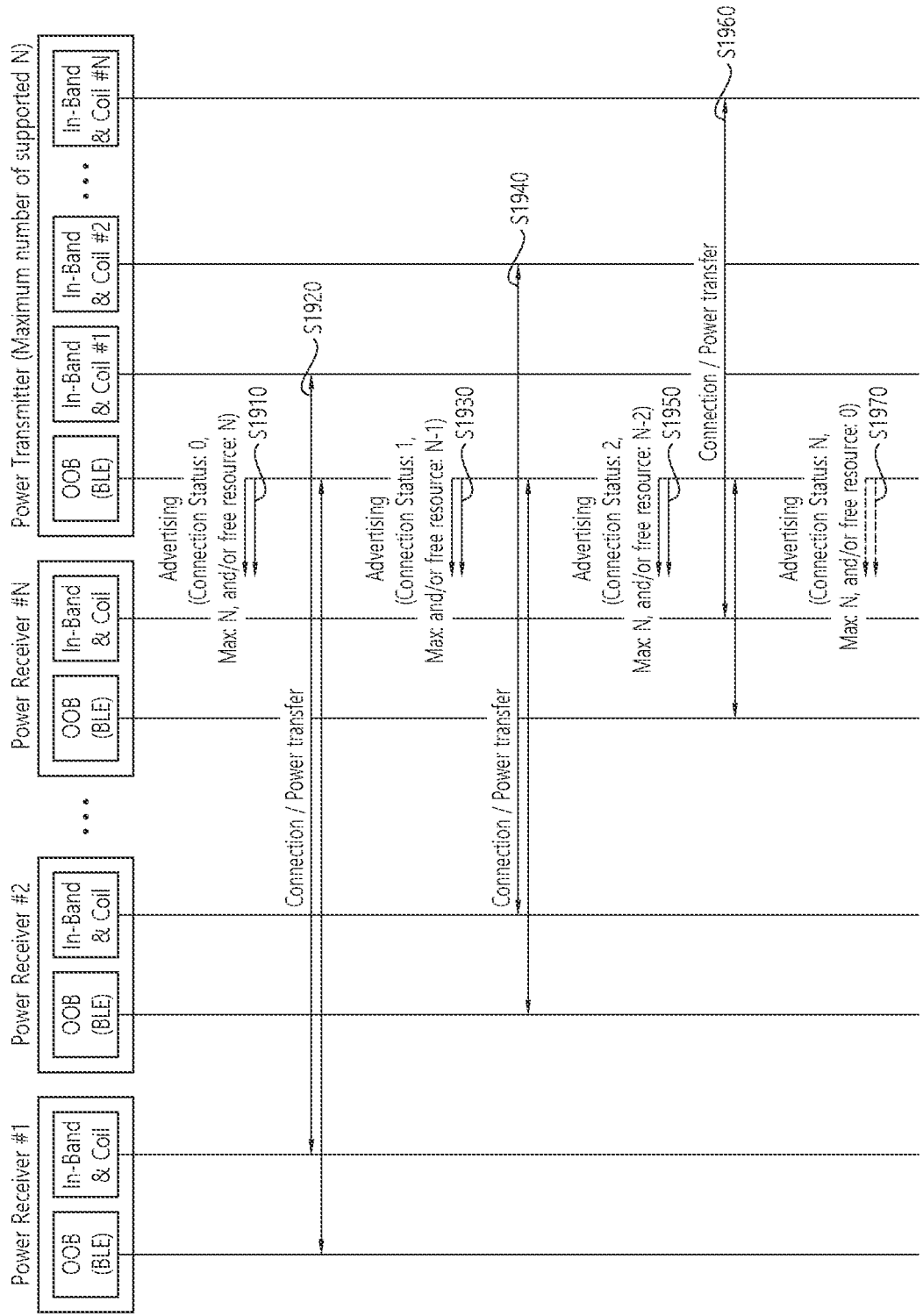
FIG. 19 is a flowchart illustrating an operation between a wireless power transmitter and a wireless power receiver according to an embodiment.

FIG. 19 is a flowchart illustrating an operation between a wireless power transmitter and a wireless power receiver according to an embodiment.

Hereinafter, as a first embodiment, a method of notifying information about the maximum number of supported wireless power receivers when the wireless power transmitter operates as an advertiser will be described with reference to FIG. 19.

Referring to FIG. 19, the wireless power transmitter may transmit an advertising packet until it is connected to N wireless power receivers. The advertising packet may include at least one of information about availability of service, information on the number of wireless power receivers capable of service support (or the maximum number of connectable wireless power receivers), or information on the number of currently connected wireless power receivers (connection status). For example, the wireless power transmitter transmits an advertising packet informing that there is no currently connected wireless power receiver before being connected to the first wireless power receiver (S1910), when connected to the first wireless power receiver (S1920), the wireless power transmitter may transmit an advertising packet including information indicating that the number of currently connected wireless power receivers is 1 and/or information indicating that N−1 wireless power receivers are connectable (S1930). That is, when the wireless power transmitter is connected to the first wireless power receiver, the number of additionally connectable wireless power receivers (remaining resources) is set to N−1. Then, when the wireless power transmitter is connected to the second wireless power receiver (S1940), the wireless power transmitter may transmit an advertising packet including information indicating that the number of currently connected wireless power receivers is 2 and/or information indicating that N−2 wireless power receivers are connectable (S1950). In this way, the above parameter values are updated every time the wireless power receiver is connected, and the wireless power transmitter then transmits advertisement information including the updated parameter value.

After the wireless power transmitter is connected to the N wireless power receivers (S1960), various embodiments are possible with respect to whether the advertisement continues, that is, whether to periodically transmit the advertising packet.

In an example, the method may include transmitting an advertising packet while the wireless power transmitter connects to or transmits wireless power to 0 to N−1 wireless power receivers, completing the connection by the wireless power receiver receiving the advertising packet and transmitting a connection request message to the wireless power transmitter, and stopping transmission of the advertising packet when the wireless power transmitter is connected to the N-th wireless power receiver. In this case, the N+1th wireless power receiver cannot discover the wireless power transmitter and cannot connect.

As another example, the wireless power transmitter continuously transmits the advertising packet regardless of the number of wireless power receivers connected to the wireless power transmitter. That is, even if the wireless power transmitter has already provided the service to the maximum number of wireless power receivers that can be serviced, the wireless power transmitter continues to transmit the advertising packet without stopping. The wireless power transmitter includes information on the number of wireless power receivers connected to itself and/or the maximum number of wireless power receivers connectable to the wireless power transmitter in the advertising packet. That is, the wireless power transmitter includes information such as the number of currently connected wireless power receivers, the maximum number of connectable wireless power receivers, and the number of wireless power receivers that can be connected in the future in the advertising packet. That is, whenever a connection is added, the wireless power transmitter changes the parameter values included in the advertising packet, and when the connection with the N wireless power receivers is completed, information such as "Connection Status: N, Max: N, Free Resource: 0" is transmitted (S1970). Upon receiving this, the wireless power receiver does not additionally request a connection.

Based on the number of wireless power receivers connected to the wireless power transmitter and/or the maximum number of devices connectable to the wireless power transmitter, the wireless power receiver that has received the advertising packet may determine whether a connection between itself and the wireless power transmitter is possible. For example, if the number of wireless power receivers currently connected to the wireless power transmitter is smaller than the maximum number connectable to the wireless power transmitter, the wireless power receiver may determine that connection with the wireless power transmitter is possible. If the number of wireless power receivers currently connected to the wireless power transmitter is N, the wireless power receiver can discover the wireless power transmitter, but cannot connect. At this time, the wireless power receiver may not perform a connection request to the wireless power transmitter, or even if a connection request is made, the wireless power transmitter may reject it.

The wireless power transmission device in the embodiment according to FIGS. 18 and 19 corresponds to the wireless power transmission device or the wireless power transmitter or the power transmission unit disclosed in FIGS. 1 to 11. Accordingly, the operation of the wireless power transmitter in this embodiment is implemented by one or a combination of two or more of each of the components of the wireless power transmitter in FIGS. 1 to 11. For example, the out-band (Bluetooth®) communication module, the in-band communication module, and the control unit according to FIGS. 18 and 19 may be the communication/control unit 120 or may be included in the communication/control unit 120. In addition, transmission of the advertising packet, the operation of the advertiser, and the connection operation with a plurality of wireless power receivers according to FIGS. 18 and 19 may be performed by the communication/control unit 120.

The wireless power receiving device in the embodiment according to FIGS. 18 and 19 corresponds to the wireless power receiving device or the wireless power receiver or the power receiving unit disclosed in FIGS. 1 to 11. Accordingly, the operation of the wireless power receiver in this embodiment is implemented by one or a combination of two or more of the respective components of the wireless power receiver in FIGS. 1 to 11. For example, the out-band (Bluetooth®) communication module, the in-band communication module, and the control unit according to FIGS. 18 and 19 may be the communication/control unit 220 or may be included in the communication/control unit 220. For example, reception of the advertising packet according to FIGS. 18 and 19, an operation of a scanner, and an operation of connecting to the wireless power transmitter may be performed by the communication/control unit 220.

Figure 20:
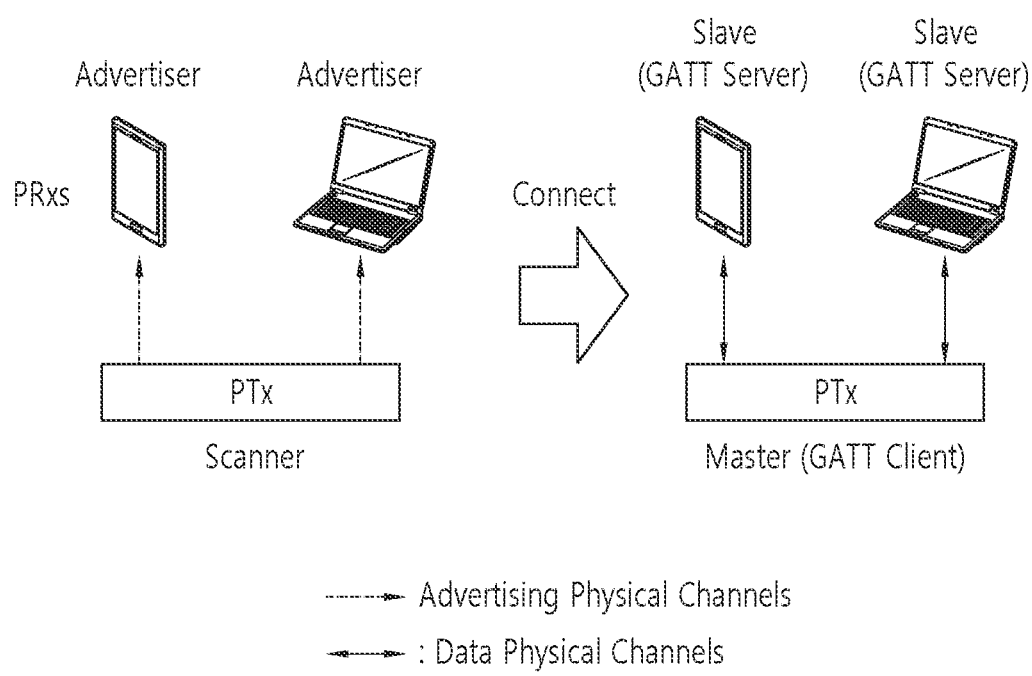
FIG. 20 is a diagram showing the role structure of the wireless power transmitter and the wireless power receiver according to another example.
Figure 21:
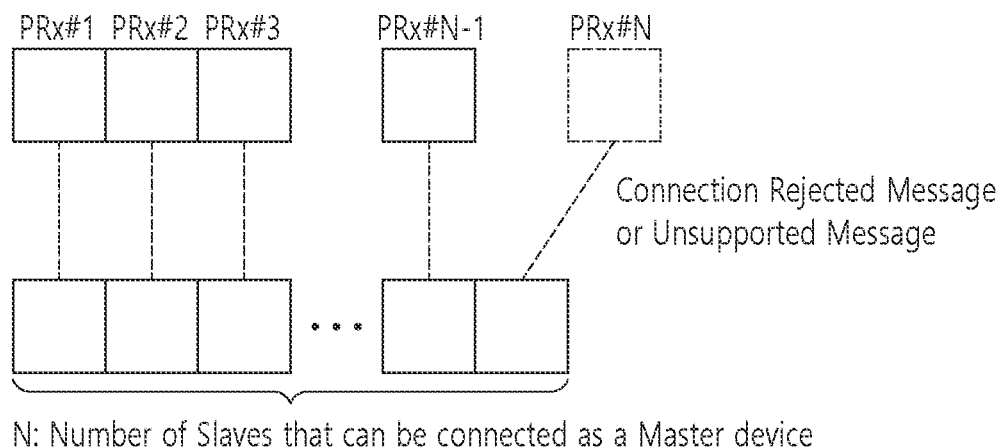
FIG. 21 is a conceptual diagram of a method of notifying the maximum number of supported devices when the wireless power transmitter operates as a scanner.

FIG. 20 is a diagram showing the role structure of the wireless power transmitter and the wireless power receiver according to another example, FIG. 21 is a conceptual diagram of a method of notifying the maximum number of supported devices when the wireless power transmitter operates as a scanner.

Referring to FIG. 20, the wireless power transmitter operates as a scanner before connection with the wireless power receiver, and operates as a master after connection with the wireless power receiver. The wireless power receivers may operate as advertisers before being connected to the wireless power transmitter, and may operate as slaves after being connected to the wireless power transmitter.

When the wireless power transmitter can connect and provide a service to the N wireless power receivers, as shown in FIG. 21, the wireless power transmitter maintains connection and service with up to N−1 wireless power receivers at the same time. While the wireless power transmitter is already connected to the maximum number (N−1) of wireless power receivers allowed to them and provides them with a wireless charging service, additionally, when the Nth wireless power receiver requests charging and/or connection, after the wireless power transmitter is connected to the Nth wireless power receiver, the wireless power transmitter may transmit a connection rejection or charging support impossible message to the corresponding wireless power receiver and terminate the connection. Accordingly, the wireless charging service is not supported for the N-th wireless power receiver.

Figure 22:
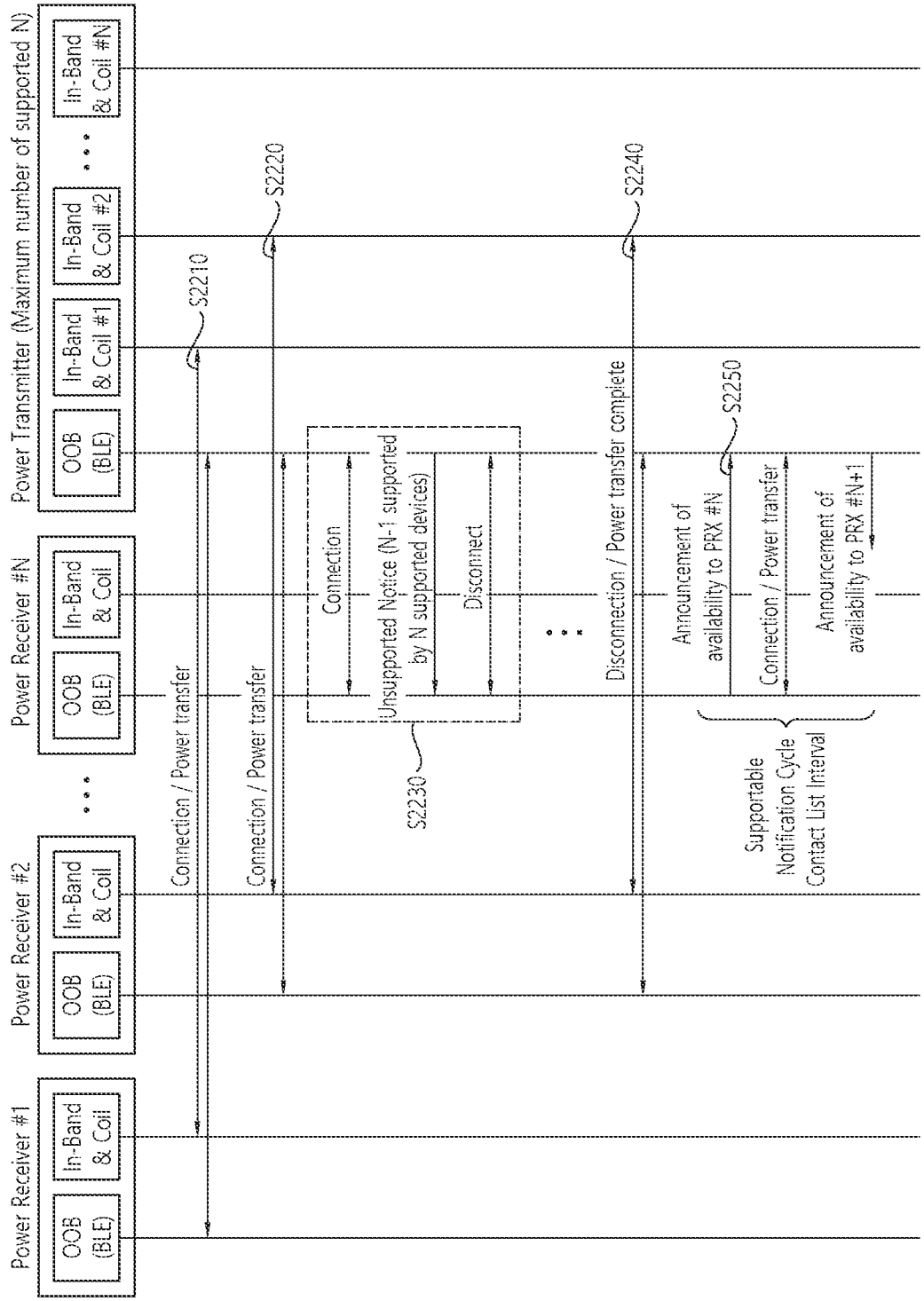
FIG. 22 is a flowchart illustrating an operation between a wireless power transmitter and a wireless power receiver according to another embodiment.

FIG. 22 is a flowchart illustrating an operation between a wireless power transmitter and a wireless power receiver according to another embodiment.

Hereinafter, as a second embodiment, a method of notifying information about the maximum number of supported wireless power receivers when the wireless power transmitter operates as a scanner will be described in more detail with reference to FIG. 22.

Referring to FIG. 22, the wireless power transmitter is connected to the first wireless power receiver to transmit wireless power (S2210), and is connected to the second wireless power receiver to transmit wireless power (S2220). When the Nth wireless power receiver requests additional OOB connection and power transmission by sending an advertising packet in the state in which the maximum number of wireless power transmitters that can be connected to the wireless power receiver is N and the wireless power transmitter is connecting out-band communication with N−1 wireless power receivers and transmitting wireless power, the wireless power transmitter connects out-band communication with the Nth wireless power receiver, afterwards, it uses a GATT-based message to inform that N−1 PRx are currently being serviced and that additional service support is not possible, the out-band connection may be terminated (S2230). That is, the wireless power transmitter may not perform a wireless charging service for the N-th wireless power receiver.

When a charging device occurs while the wireless power transmitter is charging N−1 wireless power receivers, the wireless power receiver terminates the out-band connection with the wireless power transmitter (S2240). In this case, based on the list of devices that have recently requested charging, the wireless power transmitter may sequentially make a connection request to the corresponding wireless power receiver to deliver information indicating that service support is possible (S2250). If the Nth wireless power receiver wants to charge, the wireless power transmitter establishes an out-band connection with the corresponding wireless power receiver and starts transmitting power.

For this purpose, as an example, the wireless power transmitter may induce the wireless power receiver to request a connection by notifying service supportable information to devices that have recently requested charging.

As another example, the wireless power transmitter may request a direct connection to devices that have recently requested charging. In this case, the wireless power transmitter may request a connection one by one among the wireless power receivers in the list, and inquire whether to use the wireless charging service. In this case, a period of inquiring each wireless power receiver for a connection request and service use (i.e., a supportable notification period) is referred to as a contact list interval.

The wireless power transmitter in the embodiment according to FIG. 22 corresponds to the wireless power transmission device or wireless power transmitter or power transmission unit disclosed in FIGS. 1 to 11. Accordingly, the operation of the wireless power transmitter in this embodiment is implemented by one or a combination of two or more of each of the components of the wireless power transmitter in FIGS. 1 to 11. For example, the out-band (Bluetooth®) communication module, the in-band communication module, and the control unit according to FIG. 22 may be the communication/control unit 120 or may be included in the communication/control unit 120. In addition, the reception of the advertising packet, the operation of the scanner, and the connection operation with a plurality of wireless power receivers according to FIG. 22 may be performed by the communication/control unit 120.

The wireless power receiver in the embodiment according to FIG. 22 corresponds to the wireless power receiving device or wireless power receiver or the power receiving unit disclosed in FIGS. 1 to 11. Accordingly, the operation of the wireless power receiver in this embodiment is implemented by one or a combination of two or more of the respective components of the wireless power receiver in FIGS. 1 to 11. For example, the out-band (Bluetooth®) communication module, the in-band communication module, and the control unit according to FIG. 22 may be the communication/control unit 220 or may be included in the communication/control unit 220. For example, the operation of the advertiser according to FIG. 22 and the operation of connecting to the wireless power transmitter may be performed by the communication/control unit 220.

Figure 23:
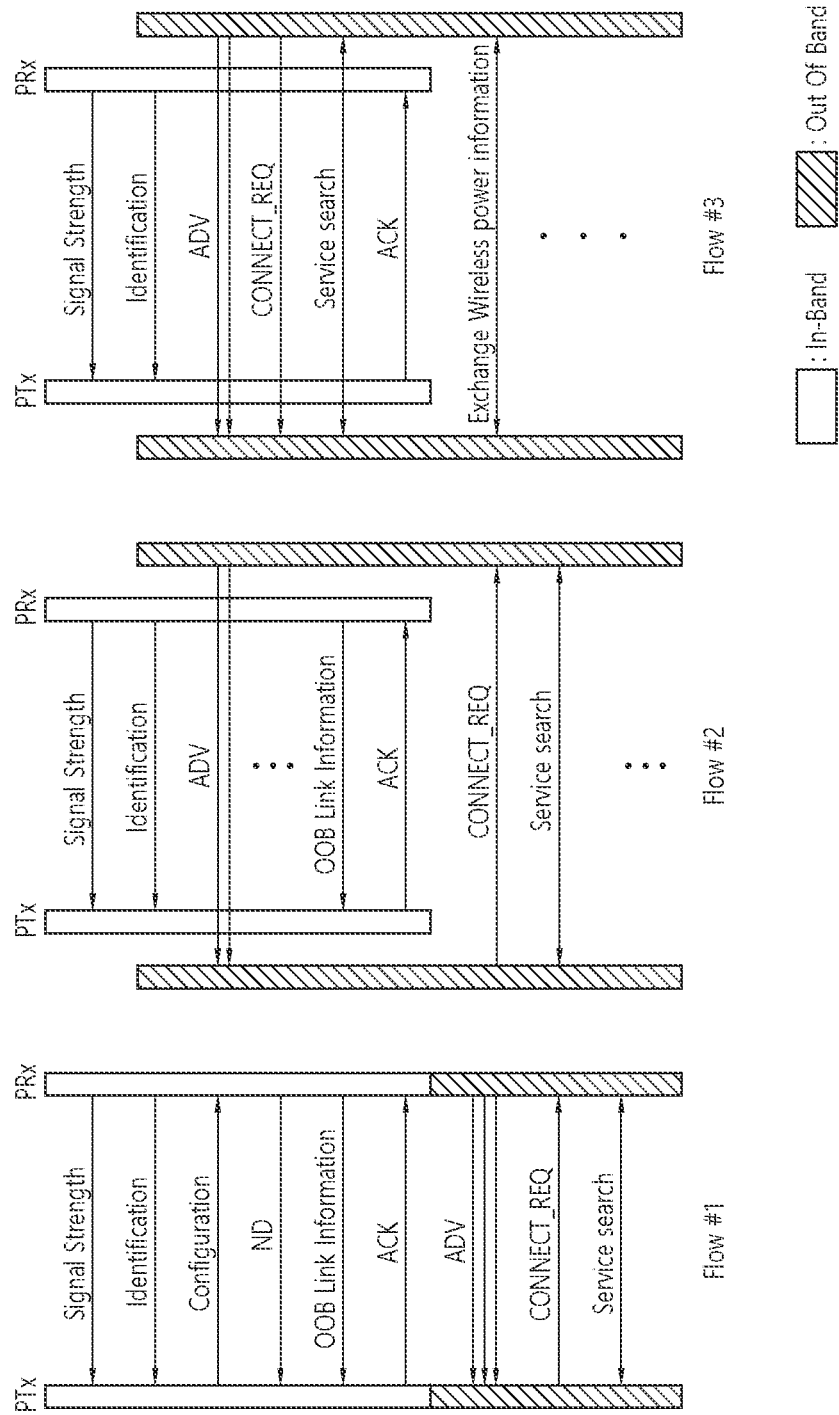
FIG. 23 is a conceptual diagram illustrating a method of shortening the switching time from in-band communication to out-band communication according to an embodiment.

FIG. 23 is a conceptual diagram illustrating a method of shortening the switching time from in-band communication to out-band communication according to an embodiment.

Referring to FIG. 23, in the case of Flow #1, the wireless power transmitter and the wireless power receiver exchange signal strength packets, identification packets, configuration packets, NDs, and out-band link information based on in-band communication. In addition, the wireless power transmitter and the wireless power receiver configure the Bluetooth Low Energy® operation (transmission of advertising information, search and connection through scan) by activating the out-band communication module (Bluetooth Low Energy®). However, in the case of Flow #1, when the in-band communication is terminated, the out-band communication module is activated and then the out-band communication is started, so that the handover takes a long time.

For example, when the wireless power receiver operates as an advertiser and the wireless power receiver operates as a scanner, the wireless power transmitter transmits a connection request message to request a connection, time is required in the following situations.

1. Time when the wireless power receiver activates out-band communication and starts transmitting the advertising packet
2. Time when the wireless power transmitter receives the advertising information (or advertising packets) to transmit the connection request message (Affected by advertising interval, etc.)
3. Service discovery process after connection—(retrieving handle value in GATT database, etc.)

Therefore, to reduce such a time delay, as in Flow #2, the wireless power receiver may perform a search operation by activating the out-band communication module in advance when the identification step is completed. In this case, the wireless power transmitter may immediately transmit a connection request message to the corresponding wireless power receiver at the end of the in-band communication operation.

Flow #3 represents an operation in which, when the identification step is completed, the wireless power transmitter and the wireless power receiver activate the out-band communication module to perform search, connection, and service discovery operations. In this case, it is possible to exchange information on wireless power transmission based on out-band communication from the time when the in-band operation is terminated.

The wireless power transmitter in the embodiment according to FIG. 23 corresponds to a wireless power transmission device or a wireless power transmitter or a power transmission unit disclosed in FIGS. 1 to 11. Accordingly, the operation of the wireless power transmitter in this embodiment is implemented by one or a combination of two or more of each of the components of the wireless power transmitter in FIGS. 1 to 11. For example, the out-band (Bluetooth®) communication module, the in-band communication module, and the control unit according to FIG. 22 may be the communication/control unit 120 or may be included in the communication/control unit 120.

The wireless power receiver in the embodiment according to FIG. 23 corresponds to the wireless power receiving device or wireless power receiver or power receiving unit disclosed in FIGS. 1 to 11. Accordingly, the operation of the wireless power receiver in this embodiment is implemented by one or a combination of two or more of the respective components of the wireless power receiver in FIGS. 1 to 11. For example, the out-band (Bluetooth®) communication module, the in-band communication module, and the control unit according to FIG. 22 may be the communication/control unit 220 or may be included in the communication/control unit 220.

Figure 24:
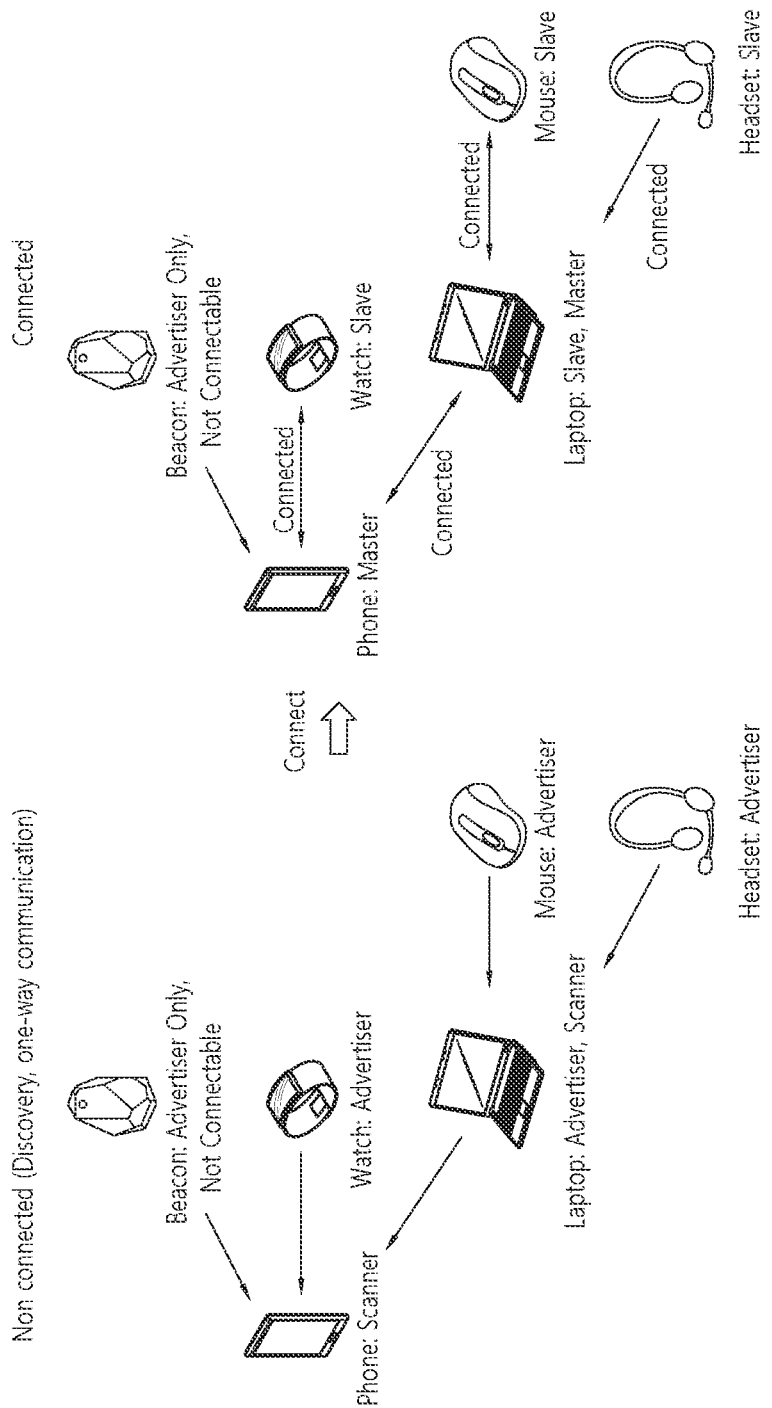
FIG. 24 is a view showing a general Bluetooth Low Energy® operation of each device when various devices (smartphone, beacon, watch, notebook, mouse, headset, etc.) are connected.

FIG. 24 is a view showing a general Bluetooth Low Energy® operation of each device when various devices (smartphone, beacon, watch, notebook, mouse, headset, etc.) are connected.

Referring to FIG. 24, a smart phone operates as a scanner and searches for a device by receiving advertisement packets from peripheral devices.

Beacons, clocks, and laptops act as advertisers and inform the scanner of their device information (i.e. address, device name, etc.). In this case, in the case of a laptop computer, it may act as a scanner to scan device information desired to be connected to the laptop computer while notifying a scanner such as a smartphone of its own information. The laptop receives the advertising packet broadcast by devices such as a mouse and headset, and identifies nearby devices that can be connected.

In the case of a beacon, it is not connected and information transfer is performed only with the information of the advertising packet.

The smartphone enters the connected state by making a connection request to the watch and the laptop, and operates as a master, while the watch and the laptop play a slave role.

The laptop enters the connected state by making a connection request to the mouse and the headset, and acts as a master, while the mouse and the headset act as slaves. That is, the notebook operates as a slave to the smartphone, but operates as a master to the mouse and headset.

Figure 25:
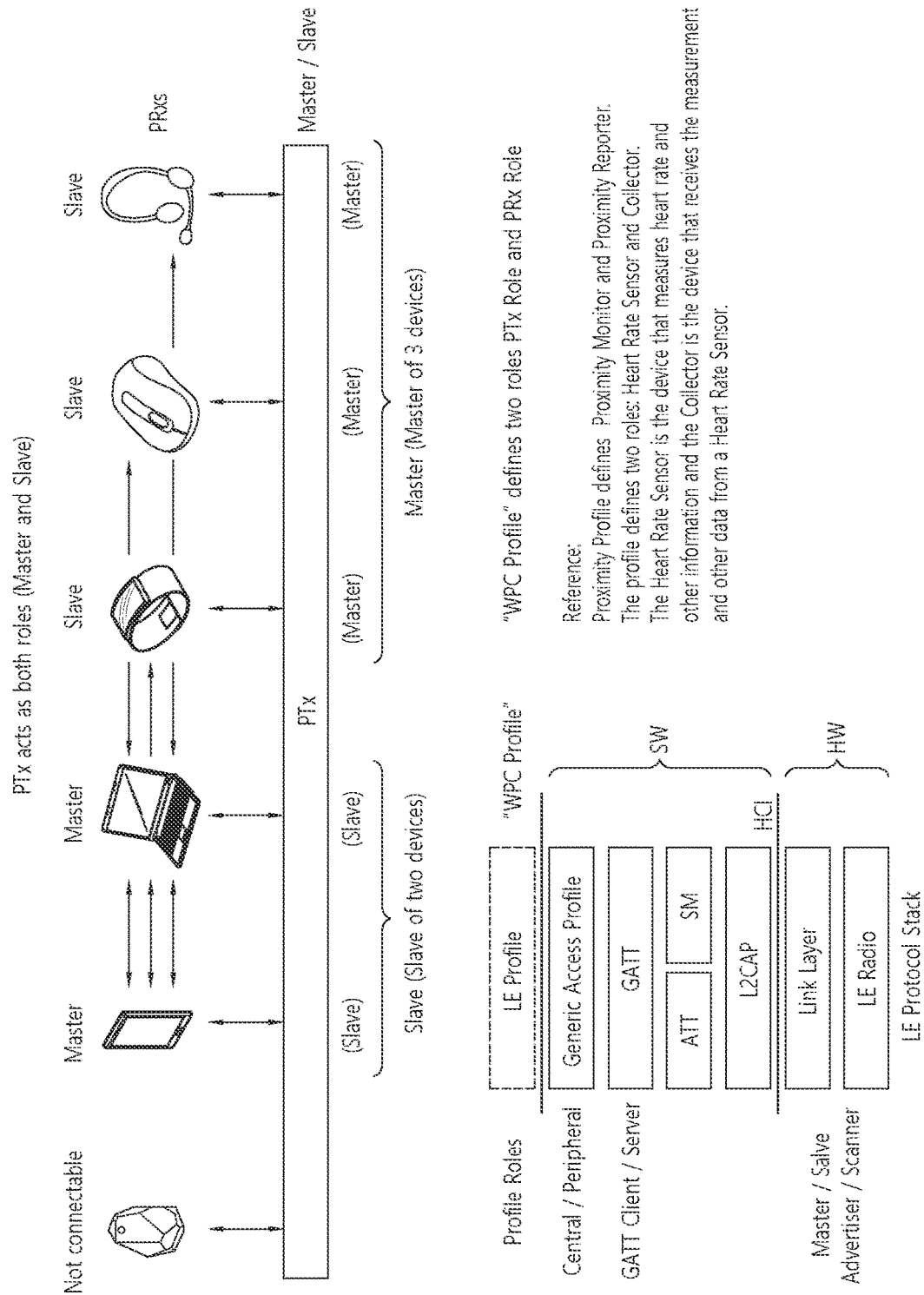
FIGS. 25 and 26 are diagrams illustrating Bluetooth Low Energy® operation of each device when a wireless power transmitter is connected to various devices (smartphone, beacon, watch, notebook, mouse, headset, etc.) according to an example.
Figure 26:
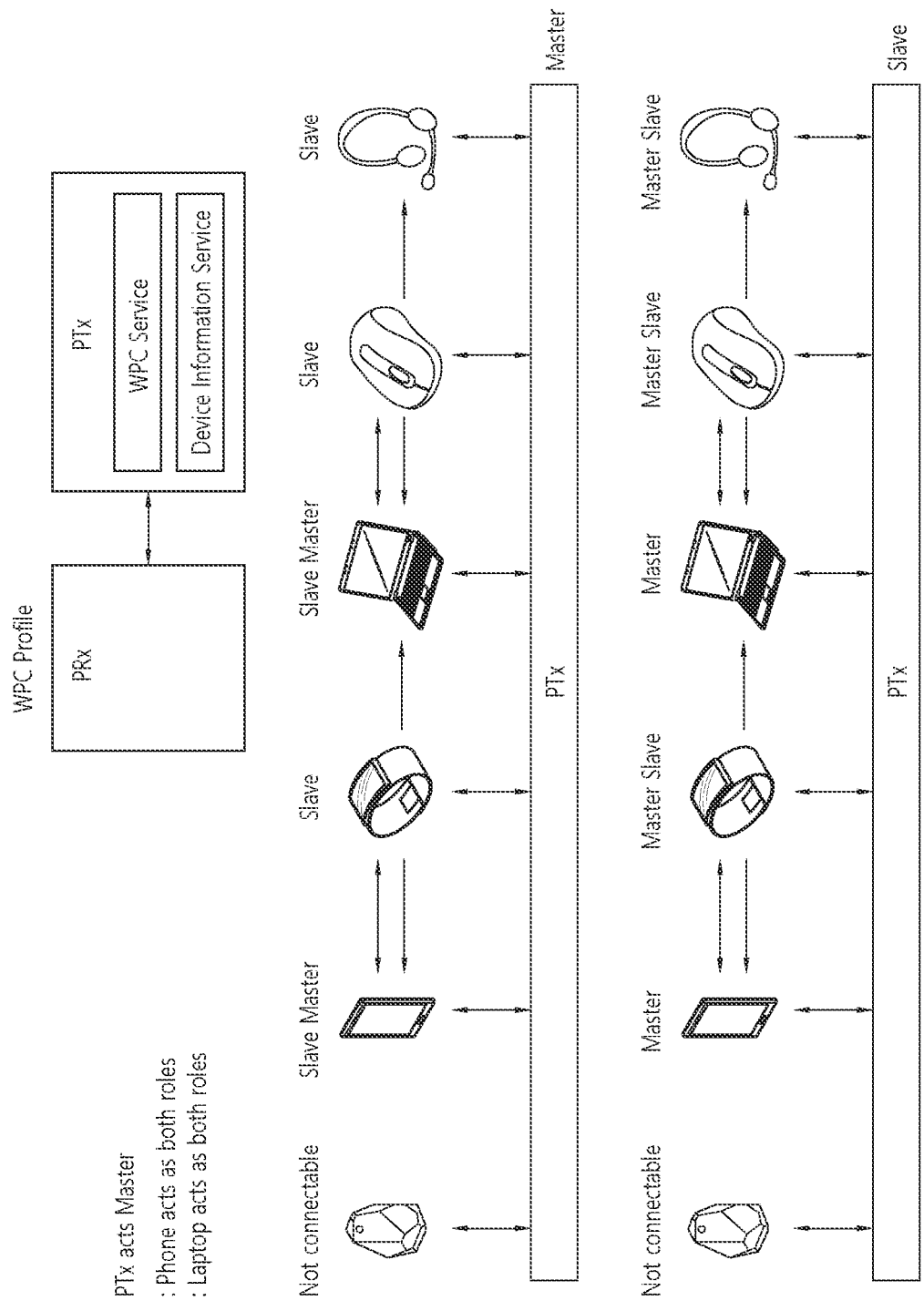

FIGS. 25 and 26 are diagrams illustrating Bluetooth Low Energy® operation of each device when a wireless power transmitter is connected to various devices (smartphone, beacon, watch, notebook, mouse, headset, etc.) according to an example.

Referring to FIG. 25, rules to be performed by devices are defined when devices perform wireless charging while maintaining a completed topology according to FIG. 24.

In a situation where it is loaded on the wireless power transmitter and charged, devices that have formed the topology (smartphones, laptops, watches, mice, headsets, etc.) can release the previously formed topology and re-establish a connection with the wireless power receiver. However, when a connection with the wireless power transmitter is additionally formed without releasing the existing topology, each device performs a role as shown in FIG. 25. In this case, the wireless power transmitter performs both the master and slave roles, the wireless power receivers maintain the role they played when forming the existing topology.

In this way, when the wireless power transmitter performs both the roles of the master and the slave, confusion may occur in the connection method between devices. For example, there may be ambiguity as to whether the wireless power receiver should request the connection or the wireless power transmitter should request the connection. In addition, when the wireless power transmitter performs two roles, the operating load of the wireless power transmitter may increase. Therefore, in this embodiment, the wireless power transmitter can perform only one role as shown in FIG. 26.

When the wireless power transmitter performs the role of the master, in the existing topology (that is, when the wireless power transmitter is not connected before charging starts), a smartphone and a laptop that have been playing a master role can additionally play a slave role. That is, when the wireless power transmitter is designed to operate as a master in the WPC standard, a wireless power receiver such as a smartphone and a notebook device may perform a dual role for Bluetooth Low Energy® out-band communication operation.

On the other hand, when the wireless power transmitter performs a slave role, a watch, a mouse, and a headset that perform a slave role in the existing topology may additionally perform a master role. However, this may not be recommended for devices with low computing power because the burden is high.

Since all components or steps are not essential for the wireless power transmission method and apparatus, or the reception apparatus and method according to the embodiment of the present document described above, a wireless power transmitting device and method, or receiving device and method, may be performed by including some or all of the components or steps described above. In addition, the above-described wireless power transmission apparatus and method, or the embodiment of the reception apparatus and method may be performed in combination with each other. In addition, each component or step described above does not necessarily have to be performed in the order described, and it is also possible that the steps described later are performed prior to the steps described earlier.

The above description is merely illustrative of the technical idea of the present disclosure, those of ordinary skill in the art to which the present disclosure pertains will be able to make various modifications and variations without departing from the essential characteristics of the present disclosure. Accordingly, the embodiments of the present disclosure described above may be implemented separately or in combination with each other.

Accordingly, the embodiments disclosed in the present disclosure are not intended to limit the technical spirit of the present disclosure, but to explain, and the scope of the technical spirit of the present disclosure is not limited by these embodiments. The protection scope of the present disclosure should be interpreted by the following claims, and all technical ideas within the scope equivalent thereto should be construed as being included in the scope of the present disclosure.

The term "Bluetooth®" is recognized as a trademark.

What is claimed is:

1. A wireless power transmitter comprising:
    a power conversion circuit, which has a plurality of primary coils, configured to transfer a wireless power to a wireless power receiver using a primary coil that forms a magnetic coupling with the wireless power receiver at an operating frequency; and
    a communication/control circuit configured to:
        perform an in-band communication with the wireless power receiver using the operating frequency, and
        perform an out-band communication with the wireless power receiver using a frequency other than the operating frequency,
    wherein the wireless power transmitter is configured to:
        receive, from the wireless power receiver via the in-band communication, a configuration packet,
            wherein the configuration packet related to the wireless power receiver includes information regarding whether the out-band communication is supported or not; and
        transmit, to the wireless power receiver via the out-band communication, an advertisement packet,
            wherein the advertisement packet includes both i) information regarding a maximum number of connectable wireless power receivers of the wireless power transmitter and ii) information regarding a number of currently connected wireless power receivers of the wireless power transmitter,
    wherein the wireless power transmitter is configured to transmit the advertisement packet regardless of the number of currently connected wireless power receiver of the wireless power transmitter, and
    wherein, based on both i) the information regarding the maximum number of connectable wireless power receivers of the wireless power transmitter and ii) the information regarding the number of currently connected wireless power receivers of the wireless power transmitter, the wireless power transmitter is configured to connect with the wireless power receiver and transmit the wireless power to the wireless power receiver.

2. A wireless power receiver comprising:
    a power pickup circuit configured to:
        receive a wireless power from a wireless power transmitter by a magnetic coupling with the wireless power transmitter having a primary coil at an operating frequency, and
        convert an AC signal generated by the wireless power into a DC signal;
    a communication/control circuit configured to:
        perform an in-band communication with the wireless power transmitter using the operating frequency, and
        perform an out-band communication with the wireless power transmitter or other device using a frequency other than the operating frequency,
    wherein the wireless power receiver is configured to:
        transmit, to the wireless power transmitter via the in-band communication, a configuration packet,
            wherein the configuration packet related to the wireless power receiver includes information regarding whether the out-band communication is supported or not; and
        receive, from the wireless power transmitter via the out-band communication, an advertisement packet,
            wherein the advertisement packet includes both i) information regarding a maximum number of connectable wireless power receivers of the wireless power transmitter and ii) information regarding a number of currently connected wireless power receivers of the wireless power transmitter,
    wherein the wireless power receiver is configured to receive the advertisement packet regardless of the number of currently connected wireless power receiver of the wireless power transmitter, and
    wherein, based on both i) the information regarding the maximum number of connectable wireless power receivers of the wireless power transmitter and ii) the information regarding the number of currently connected wireless power receivers of the wireless power transmitter, the wireless power receiver is configured to connect with the wireless power transmitter and receive the wireless power from the wireless power transmitter.

3. A method for transferring wireless power to a wireless power receiver, the method performed by a wireless power transmitter and comprising:
    receiving, from the wireless power receiver, a configuration packet through in-band communication,
        wherein the configuration packet related to the wireless power receiver includes information regarding whether an out-band communication is supported or not; and
    transmitting, to the wireless power receiver via the out-band communication, an advertisement packet,
        wherein the advertisement packet includes both i) information regarding a maximum number of connectable wireless power receivers of the wireless power transmitter and ii) information regarding a number of currently connected wireless power receivers of the wireless power transmitter, wherein the wireless power transmitter is configured to transmit the advertisement packet regardless of the number of currently connected wireless power receiver of the wireless power transmitter, and wherein, based on both i) the information regarding the maximum number of connectable wireless power receivers of the wireless power transmitter and ii) the information regarding the number of currently connected wireless power receivers of the wireless power transmitter, the wireless power transmitter is configured to connect with the wireless power receiver and transmit the wireless power to the wireless power receiver.

* * * * *